US012562930B2

(12) United States Patent
Paulus et al.

(10) Patent No.: US 12,562,930 B2
(45) Date of Patent: Feb. 24, 2026

(54) SENSOR SYSTEM

(71) Applicant: The United States of America as represented by the Secretary of the Navy, Keyport, WA (US)

(72) Inventors: Mark E Paulus, Poulsbo, WA (US);
Daniel A Gentile, Keyport, WA (US);
Kevin D Jones, Seaside, CA (US);
Kyler D Callahan, Denver, CO (US);
Paul R Leary, Salinas, CA (US);
Vladimir N Dobrokhodov, Seaside, CA (US); Kevin B Smith, Pacific Grove, CA (US)

(73) Assignee: The United States of America as represented by the Secretary of the Navy, Keyport, WA (US)

( * ) Notice: Subject to any disclaimer, the term of this patent is extended or adjusted under 35 U.S.C. 154(b) by 93 days.

(21) Appl. No.: 18/510,536

(22) Filed: Nov. 15, 2023

(65) Prior Publication Data

US 2024/0171416 A1 May 23, 2024

Related U.S. Application Data

(60) Provisional application No. 63/426,368, filed on Nov. 18, 2022.

(51) Int. Cl.
*H04L 12/10* (2006.01)
*G01S 19/37* (2010.01)
(Continued)

(52) U.S. Cl.
CPC .............. *H04L 12/10* (2013.01); *G01S 19/37* (2013.01); *G06F 1/266* (2013.01); *H04J 3/0658* (2013.01)

(58) Field of Classification Search
CPC ......... H04L 12/10; G01S 19/37; G06F 1/266; H04J 3/0658; B64U 10/14; B64U 20/80;
(Continued)

(56) References Cited

U.S. PATENT DOCUMENTS 5,168,459 A * 12/1992 Hiller ................. H03H 21/0012
708/422
5,878,356 A * 3/1999 Garrot, Jr. ............... G01S 19/41
701/4
(Continued)

OTHER PUBLICATIONS

Jones, K., and Dobrokhodov, V., Aqua-Quad—Solar powered, long endurance, hybrid mobile vehicle for persistent surface and underwater reconnaissance, part I—platform design, OCEANS 2016 MTS/IEEE, 2016, pp. 1-10, IEEE, Monterey, United States of America.
(Continued)

*Primary Examiner* — Faisal M Zaman
(74) *Attorney, Agent, or Firm* — Stephen J. Leahu; Naval Undersea Warfare Center, Keyport

(57) ABSTRACT

Devices, systems and methods are provided for low-power and high-sampling rate of analog signals received from sensors transported by host devices. The devices, systems and methods may be adapted to utilize GPS and PPS signals for synchronization with digitized signals generated based on the sampling of the analog signals that are simultaneously received and processed by multiple channels. Synchronized data packets may be recorded by the disclosed data acquisition systems, and may be further transmitted to host devices and remote devices.

89 Claims, 19 Drawing Sheets

(51) Int. Cl.
    *G06F 1/26*         (2006.01)
    *H04J 3/06*         (2006.01)

(58) Field of Classification Search
    CPC ............ B64U 2101/15; B64U 2101/20; H04Q
            2209/30; H04Q 2209/40; H04Q 2209/88;
                H04Q 9/04
    See application file for complete search history.

(56)          References Cited

U.S. PATENT DOCUMENTS

| | | | | |
|---|---|---|---|---|
| 6,402,089 | B1 * | 6/2002 | Kiss | B64C 27/001 |
| | | | | 181/207 |
| 6,484,088 | B1 * | 11/2002 | Reimer | B60K 15/077 |
| | | | | 701/123 |
| 6,722,203 | B1 * | 4/2004 | Evans | G01V 1/16 |
| | | | | 73/1.85 |
| 6,906,655 | B1 * | 6/2005 | Cox | H03M 3/324 |
| | | | | 341/155 |
| 7,026,826 | B2 | 4/2006 | Wilcoxon | |
| 7,066,026 | B2 | 6/2006 | Deng | |
| 7,104,140 | B2 | 9/2006 | Zou | |
| 7,224,640 | B2 | 5/2007 | Shipps | |
| 9,321,529 | B1 * | 4/2016 | Jones | B64U 60/10 |
| 9,457,900 | B1 | 10/2016 | Jones | |
| 2005/0153262 | A1 * | 7/2005 | Kendir | F41G 3/2655 |
| | | | | 434/21 |
| 2009/0168808 | A1 * | 7/2009 | Cho | H04J 3/0697 |
| | | | | 342/357.44 |
| 2011/0112739 | A1 * | 5/2011 | O'Dea | G01C 21/165 |
| | | | | 342/357.35 |
| 2011/0251827 | A1 * | 10/2011 | McGoogan | G01M 13/045 |
| | | | | 702/189 |
| 2012/0103245 | A1 * | 5/2012 | Lambertus | B63C 11/42 |
| | | | | 114/330 |
| 2013/0018587 | A1 * | 1/2013 | Clark | G01V 5/06 |
| | | | | 702/8 |
| 2013/0208563 | A1 * | 8/2013 | Phillips | G01V 1/003 |
| | | | | 367/14 |
| 2014/0218482 | A1 * | 8/2014 | Prince | B61L 29/32 |
| | | | | 348/47 |
| 2015/0105868 | A1 * | 4/2015 | Sin | G06F 1/14 |
| | | | | 700/7 |
| 2015/0260805 | A1 * | 9/2015 | Miura | G01R 33/1253 |
| | | | | 324/228 |
| 2017/0016940 | A1 * | 1/2017 | Liu | G01R 21/00 |
| 2018/0135988 | A1 * | 5/2018 | Cyprys | G01C 21/20 |
| 2018/0295335 | A1 * | 10/2018 | Burgess | H04N 13/296 |
| 2019/0235127 | A1 * | 8/2019 | Ray | G01V 1/24 |
| 2020/0159239 | A1 * | 5/2020 | Li | G06T 7/74 |
| 2020/0335852 | A1 * | 10/2020 | Cherdak | H04B 1/18 |
| 2022/0075092 | A1 * | 3/2022 | Huo | G01F 23/80 |
| 2022/0260663 | A1 * | 8/2022 | Pados | G01S 3/8022 |
| 2022/0303929 | A1 * | 9/2022 | Chowdhury | H03L 7/18 |
| 2023/0035972 | A1 * | 2/2023 | Agyeman | G01S 19/14 |

OTHER PUBLICATIONS

Leary, P., Dobrokhodov, V., Jones, J., and Smith, K., A flexible, open-source DAQ for real-time multi-channel signal processing on autonomous platforms, 2018 OCEANS—MTS/IEEE Kobe Techno-Oceans (OTO), 2018, pp. 1-5, IEEE, Kobe, Japan.

Englehorn, L., Consortium for robotics and unmanned systems education and research (CRUSER) FY18 annual report, Acoustic Vector Sensing from Novel Autonomous Systems Using Light-Weight, Low-Power Data Acquisition Systems, 2018, See pp. 41-43, Naval Postgraduate School, Monterey, United States of America.

Leary, P., Dobrokhodov, V., Jones, J., and Smith, K., Real-time multi-channel acoustic beamforming using a lightweight microcontroller processor, OCEANS 2019 MTS/IEEE Seattle, 2019, pp. 1-6, IEEE, Seattle, United States of America.

Jones, K., and Dobrokhodov, V., FY17 Call for proposals, Aqua-quad: Solar powered, long endurance, hybrid mobil buoy for persistent surface and underwater, 2019, p. 1, Naval Postgraduate School, Monterey, United States of America.

Smith, K. B., and Dobrokhodov, V., FY19 call for proposals, Acoustic target motion analysis from novel autonomous systems using light-weight, low-power data acquisition systems, 2019, p. 1, Naval Postgraduate School, Monterey, United States of America.

Dobrokhodov, V., Jones, K., and Leary, P., FY19 call for proposals, Enable real-time access to underwater acoustic and beam-forming data on a hybrid aqua-quad vehicle, 2019, p. 1, Naval Postgraduate School, Monterey, United States of America.

Englehorn, L., Consortium for robotics and unmanned systems education and research (CRUSER) 2019 annual report, Enable real-time access to underwater acoustic and beam-forming data on a hybrid aqua-quad vehicle, 2019, See pp. 33-36, Naval Postgraduate School, Monterey, United States of America.

Desert Star Systems LLC, SonarPoint TM The High-Capability Sound Recording & Localization Toolkit Brochure, 2020, pp. 1-8, Marina, California, United States of America.

Measurement Computing Corporation, WebDAQ 504 Internet Enabled Vibration/Acoustic Logger, Rev. 3, Sep. 2019, pp. 1-8, Concord, NH, United States of America.

* cited by examiner

7001 Anti-Alias Filtering

7002 Bipolar-to-Unipolar Converting

7003 Analog-Scaling

7004 Sampling

7005 Digital Filtering

7006 Digital Scaling

7007 Synchronizing

7008 Storing

1000

1011

1001

1011

1000

SENSOR SYSTEM

CROSS REFERENCE TO RELATED APPLICATION

This non-provisional patent application claims priority to, and incorporates herein by reference in its entirety, U.S. Provisional Patent Application No. 63/426,368 that was filed Nov. 18, 2022.

STATEMENT OF GOVERNMENT INTEREST

The embodiments of the present disclosure may be manufactured and used by or for the Government of the United States of America for governmental purposes without the payment of any royalties thereon or therefor.

FIELD OF THE DISCLOSURE

The present disclosure relates in general to the fields of sensors and data acquisition, and in particular to systems, methods, apparatuses and computer-readable mediums for sampling, filtering, digitizing and processing signals from sensors, recording and transmitting the data, as well as powering the sensors and the data acquisition electronics that may be transported by host vehicles.

BACKGROUND

Limited techniques for data acquisition from vector sensors are known in the art. Past data acquisition systems, often referred to as DAQ systems, typically have high-power requirements and a large form factor. Many of those systems include analog to digital converters combined using backplanes to create synchronized modules. Commercially available instruments may include four-channel USB or Ethernet-based DAQ systems. Improved solutions are desired for low-power acquisition of data from one or more sensors, including an array of vector sensors that may be independently powered from a power source that may be coupled to the DAQ system, and improved methods for the filtration, processing, management, storage and transmission of data acquired from sensors. Features of the present disclosure overcome various deficiencies of the prior art by providing methods, systems and apparatuses having advantages that will become apparent from the following disclosure.

BRIEF DESCRIPTION OF THE DRA WINGS

The foregoing and other objects, features, and advantages for embodiments of the present disclosure will be apparent from the following more particular description of the embodiments as illustrated in the accompanying drawings, in which reference characters refer to the same components throughout the various views. The drawings are not necessarily to scale; emphasis instead being placed upon illustrating principles of the present disclosure.

BRIEF SUMMARY OF THE DISCLOSURE

Figure 1:
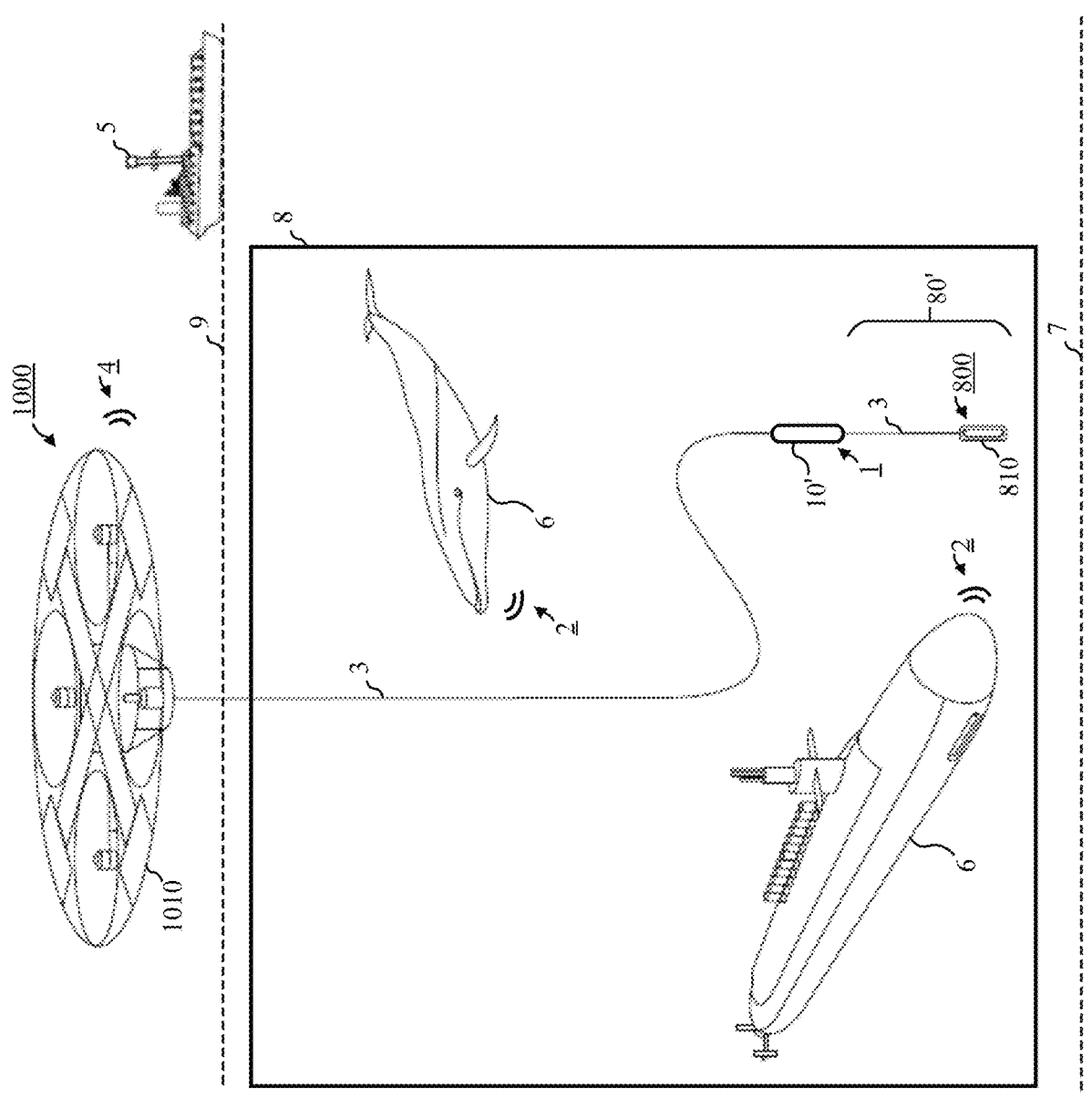
FIG. 1 illustrates an exemplary implementation of a DAQ system connected to a host device in the form of an unmanned autonomous vehicles transporting a sensor via a tether, in accordance with certain embodiments of the present disclosure.

The following presents a simplified summary of the disclosure in order to provide a basic understanding of some aspects of the disclosure. This summary is not an extensive overview of the disclosure. It is intended neither to identify key or critical elements of the disclosure, nor to delineate the scope of the disclosure. Its sole purpose is to present some concepts, in accordance with the disclosure, in a simplified form as a prelude to the more detailed description presented herein.

In accordance with certain embodiments, the disclosed systems and methods may comprise a low-power data acquisition system capable of preprocessing, conditioning and sampling four channels of analog signals based on acoustic signals detected by one or more sensors that may have a frequency range of 0 kHz to 16 KHz. According to technical advantages for some embodiments, the disclosed systems and methods may include minimal power consumption for operating miniature DAQ systems, power-over-bus connections uniquely adapted for such low-power systems, low-noise sensor power regulation, and/or the ability to record digitized signals for four analog channels with time-aligned sampling of digital data received from an array of directional or vector sensors. In certain embodiments, the disclosed DAQ system may be adapted to interface with, or to be integrated with, sensors that are commercially available from Wilcoxon Sensing Technologies.

In some embodiments, the DAQ system may be synchronized to a Global Positioning System (GPS) using Pulse Per Second (PPS) signals in order to allow the processing of analog and digital signals from multiple spatially-separated sensors that lack a physical connection. In an embodiment, a wide range of power input may be received from the sensors by the disclosed DAQ system. An internal battery, an adjacent power source, or power from a tethered host device, may be utilized to power the disclosed DAQ system as well as the sensor. Accordingly, in accordance with certain embodiments, the disclosed systems, methods, and apparatuses may engage a host device such as a transport vehicle in order to receive electrical power via a tether. Data generated in accordance with the present disclosure may be transmitted via the tether to the host device, which may be floating on the water surface, swimming under or on the water surface, or flying in the air while connected to the disclosed DAQ system via the tether. Further advantages and features of the present disclosure are illustrated in the drawings and described in detail below.

DETAILED DESCRIPTION

Reference will now be made in detail to the embodiments of the present disclosure, examples of which are illustrated in the accompanying drawings. The present disclosure may be embodied in various forms, including systems, methods, devices or computer-readable mediums for time-synchronized, miniature, low-power acquisition of data from various sensors. Benefits of the present data acquisition disclosure may be appreciated in various implementations, including those embodiments that require a low-power, lightweight, flexible data acquisition (DAQ) system for sensor integration with vehicles having tight size, weight and power (SWaP) requirements as described below.

Such SWaP requirements present a technical problem when pursuing data acquisition from a sensor transported by a host device, especially when the host device and its payloads are intended to be small enough to be undetectable and lightweight enough to monitor a targeted area for an extended period of time without loss of power. The presently disclosed systems, methods, apparatuses and computer-readable mediums provide technical solutions to such problems, as described herein. As shown in FIG. 1, in certain embodiments, the presently disclosed DAQ systems 1 may be implemented with host devices 1000 that transport sensors 800. In accordance with some embodiments, the host devices 1000 may be capable of aerial and/or aquatic operation as provided by a hybrid multi-rotor mobile vehicle 1000 that utilizes a host solar-recharge system 1010 in order to provide long endurance sensing in aquatic environments. In such implementations, sensing of acoustic signals 2 may be conducted below the thermocline layer while the multi-rotor mobile vehicle 1000 rides on the water surface 9 and/or flies in the air above the water surface 9. The host devices 1000 may be connected to the presently disclosed DAQ system 1 via a tether 3, which may further connect to the sensors 800. The sensors 800 may detect acoustic signals 2 emitted by targeted objects 6, which may be located below an underwater surface 7 within an operational/targeted area or zone 8. The targeted objects 6 may include underwater vehicles and/or animals. Accordingly, as shown in FIG. 1, the DAQ system 1 may be implemented in biological applications for monitoring and recording sea life in addition to watercrafts. Due to the lightweight and small size of the host devices 1000, the targeted animals 6 and UUVs/submarines 6 may be observed without being disturbed for an extended period of time.

Prior implementations of sensors 800 tethered to host devices 1000 that included "onboard" data acquisition, where all the DAQ components were located onboard the host device 1000 and all received analog signals were transmitted from a sensor 800 directly to the host device 1000 via a tether 3, presented limitations that are overcome by the present disclosure. Such host device 1000 included a global positioning system and inertial navigation system (GPS/INS), as well as other vehicle instrumentation for aircraft control and data processing that were located onboard the vehicle 1000. Having the DAQ components located on the vehicle 1000 required all the analog signals received from the sensor 800 to be transmitted via the tether 3 to the vehicle 1000. As described herein, certain embodiments of the present disclosure enable the signal conditioning of the received analog signals and data acquisition of digital signals at or near the sensor 800. This may provide an advantage in efficiency and accuracy over DAQ systems located on a host device 1000, as sampling rates and resolutions may be improved. Further, in some embodiments, the digitized output of DAQ systems 1 may be transmitted to the host device 1000 via a tether 3 more efficiently. For example, in certain embodiments, the DAQ system 1 has the ability to perform sensor calculations and preprocess conditioning of the signals that reduce the data storage and transfer requirements.

Figure 2:
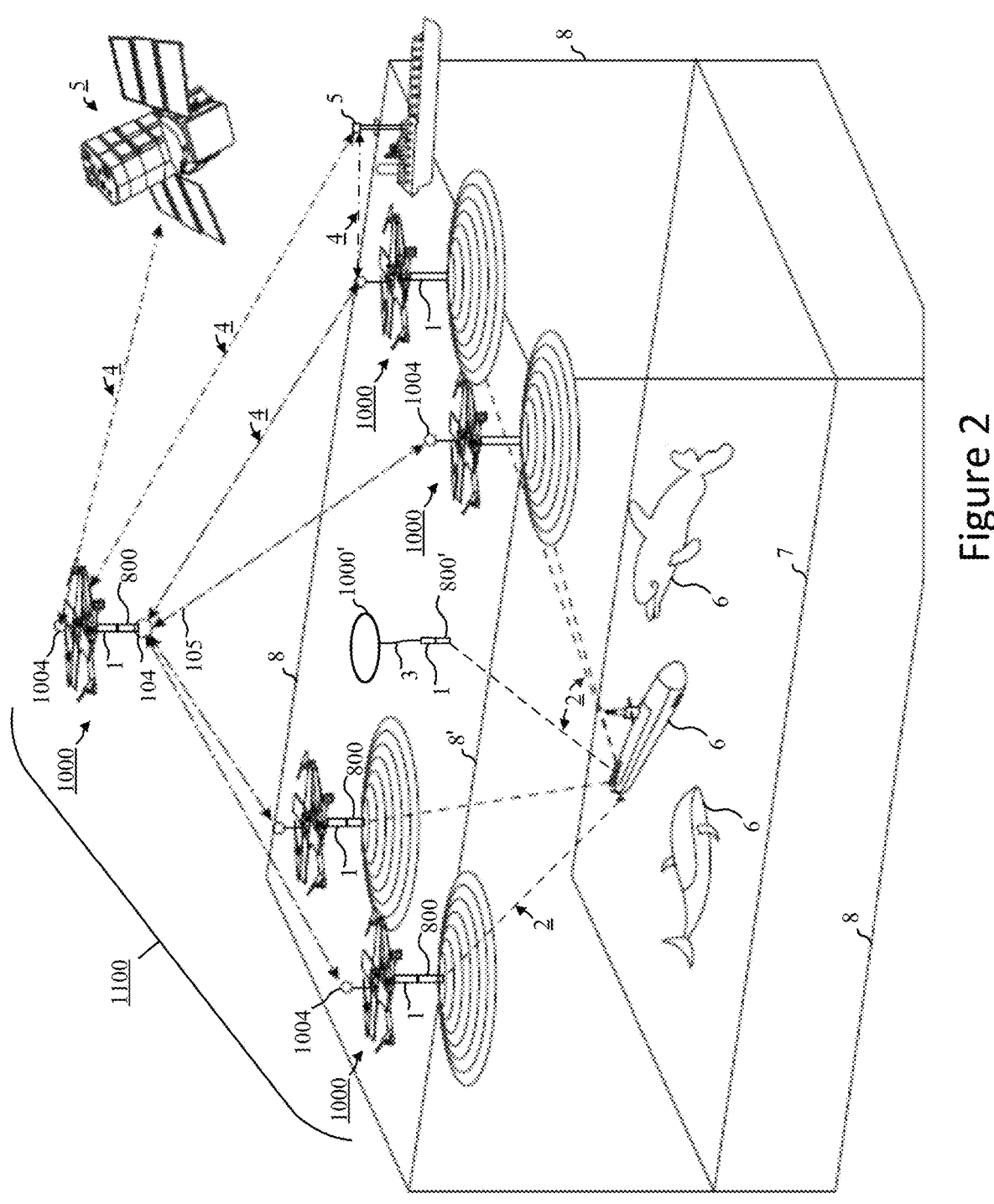
FIG. 2 illustrates an example of a swarm of cooperative host devices deployed with DAQ systems coupled to sensors that are engaged in underwater unmanned vehicle (UUV) or submarine detection and avoidance, in accordance with certain embodiments of the present disclosure.

As shown in FIG. 2, a swarm 1100 of cooperative host devices 1000 with heterogeneous sensors 800 may be deployed in an operational/targeted area or zone 8 and may distribute themselves to provide a node density for the desired area. In accordance with certain embodiments, an advantage of a predetermined positioning of the plurality of host devices 1000 within an operational area 8 may include controlling the geometry of the sensor constellation. For example, a targeted object 6 moving near a triangular sensor constellation may be easier to track by the DAQ systems 1 of the swarm 1100 than a targeted object 6 in-line with a linear constellation. The DAQ systems 1 and sensors 800 may be tethered or connected to the flying host devices 1000. While the processing of the signals received by a sensor 800 may be performed by the DAQ system 1 adjacent to the sensor 800, the digitized output may be transmitted to the host device 1000 so that the output signals 4 may be further shared with other cooperative host devices 1000 and remote devices 5 via host antennae 1004. In some embodiments, the host antennae 1004 may transmit and/or receive communication data/signals 4 such as satellite or radio frequency (RF) signals 4. In an embodiment, as shown in FIG. 2, a DAQ communication device 104 may be adapted to communicate with the host antennas 1004 of host devices 1000.

Figure 3:
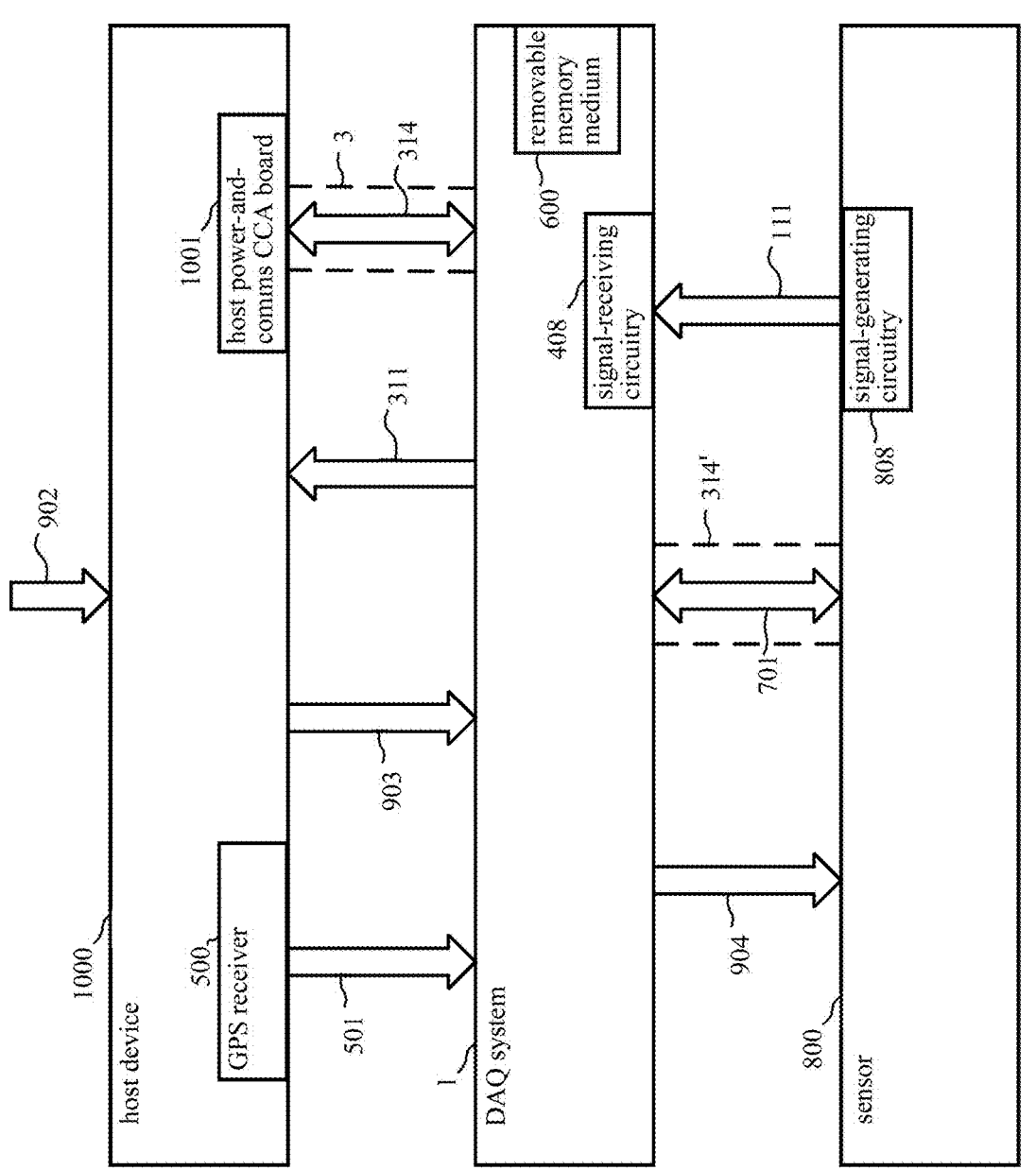
FIG. 3 is a block diagram of a DAQ system in relation to a host device and a sensor, in accordance with certain embodiments of the present disclosure.

FIG. 3 illustrates an embodiment of the present disclosure comprising a DAQ system 1 that enables the transmission of both power and data between a host device 1000 and a sensor 800. Source power 902 may be received by the host device 1000, and DAQ power 903 may be transmitted to the DAQ system 1 which may provide adjustable sensor power 904 to the sensor 800. The host device 100 may comprise a GPS receiver 500, which may transmit Global Positioning System (GPS) data 224 and Pulse Per Second (PPS) signals 501 to the DAQ system 1. The DAQ system 1 may further receive, via signal-receiving circuitry 408, analog signals 111 generated by signal-generating circuitry 808 of the sensor 800, as well as digital signals 701 via a two-wire bus 314' from the sensor 800. The DAQ system 1 may preprocess condition the analog signals 111 for sampling and synchronization with the digital signals 701 and the GPS data 224 (shown in FIG. 5) and the PPS signals 501. Such synchronized signals may be stored on a removable memory medium 600 inserted in the DAQ system 1, and may be transmitted to the host device 1000 via USB bus 315 (shown in FIG. 5), Ethernet, UART bus 311 or RS-485 bus cable 314. In some embodiments, a RS-485 bus cable 314 may be implemented within a tether 3 connecting the DAQ system 1 and the host power-and-communication board 1001 of the host device 1000. Alternatively, the combination of source-power electrical wires 907a and DAQ-power electrical wires 907b and sensor-power electrical wires 907c (shown in FIGS. 10 and 11) and UART bus 311 described herein may be utilized to transmit power and data, respectively.

Figure 4:
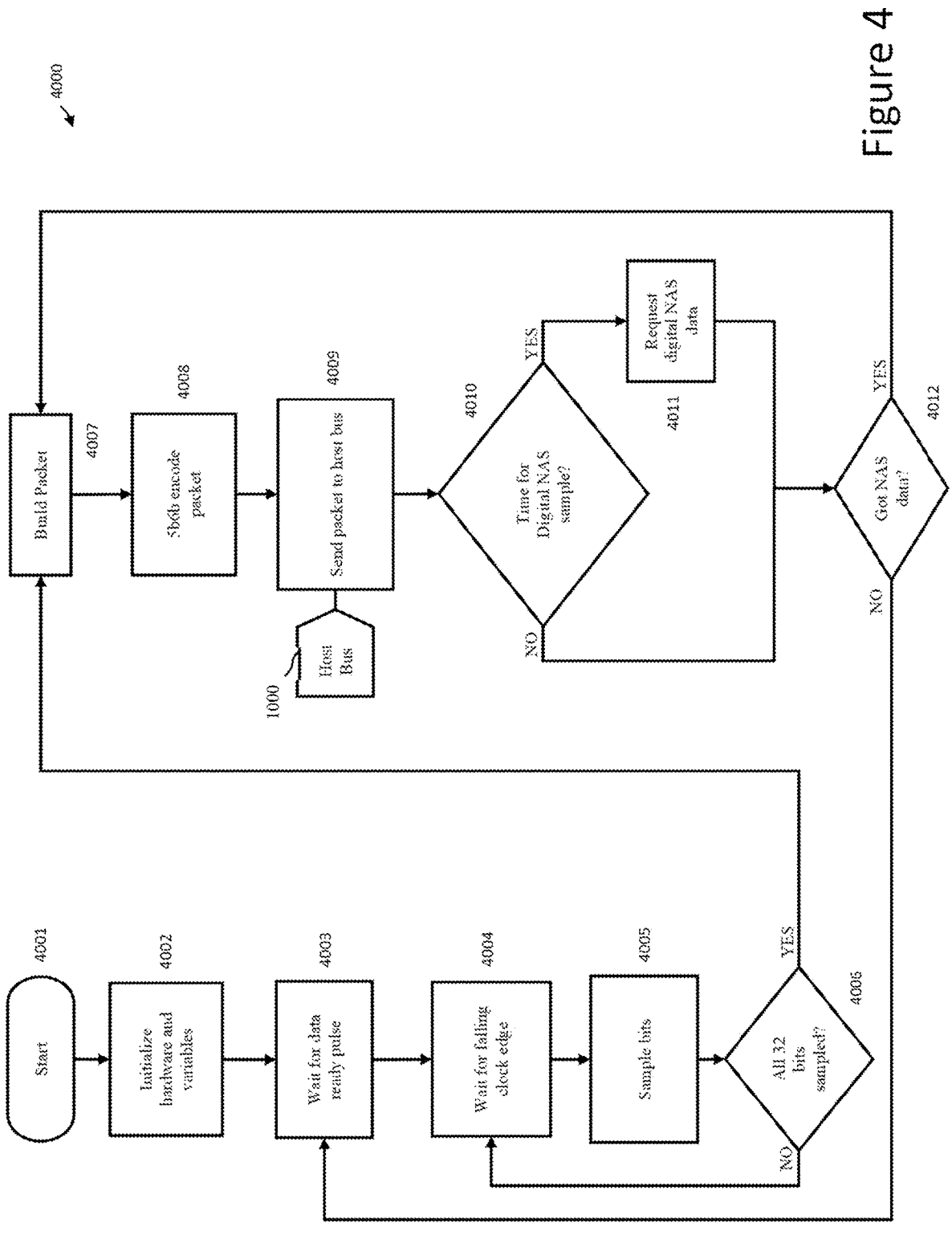
FIG. 4 is a flowchart illustrating exemplary steps of a method for operating a DAQ system, in accordance with certain embodiments of the present disclosure.

As shown in FIG. 4, an embodiment of a DAQ system 1 may be operated by first starting or powering on the DAQ system 1 as illustrated by the initial step [block 4001]. Further, the method 4000 of operating the DAQ system 1 may include the steps of initializing hardware and variables [block 4002], waiting for a data-ready pulse [block 4003], and waiting for a falling clock edge [block 4004]. The method may include the steps of sampling bits [block 4005], and waiting for an indication that all 32 bits to be sampled [block 4006] otherwise the DAQ system 1 may repeat the preceding two steps [blocks 4004 and 4005] until all 32 bits have been sampled [block 4006]. In accordance with certain embodiments, the method may include the steps of generating a packet [block 4007], encoding the packet [block 4008], and sending the packet to a host device 1000 [block 4009]. The encoding step [block 4008] may comprise encoding the packet using a 5B/6B encoding method [block 4008] that replaces each '5 bit' original input-data with '6 bit' output-data by implementing input-output mapping based on a finite-state machine behavioral model that utilizes a transition or lookup table having predetermined parameters. The method may include the steps of receiving an indication of time for digital Non-Acoustic Sensors (NAS) sample [block 4010], and then requesting digital NAS data [block 4011]. Without a digital NAS sample, the method may include the steps of receiving an indication of NAS data [block 4012], and then repeating the steps starting with the generation of a packet [block 4007]. Otherwise, the method may require the DAQ system 1 repeat the preceding steps starting with waiting for a data-ready pulse [block 4003].

Figure 5:
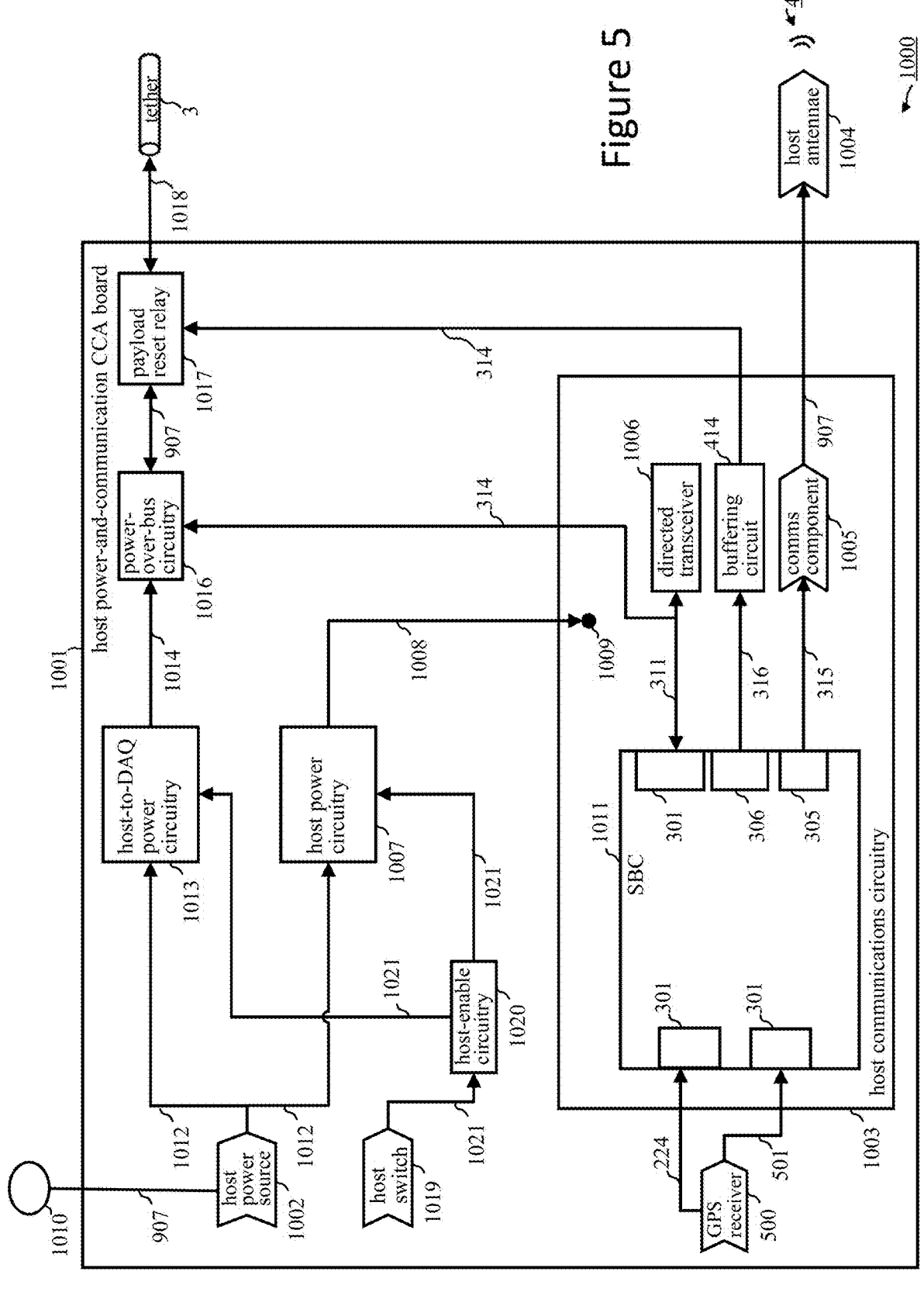
FIG. 5 is a schematic diagram of a host device that may be connected to a DAQ system such as the exemplary DAQ systems shown in FIGS. 11-12, in accordance with certain embodiments of the present disclosure.
Figure 11:
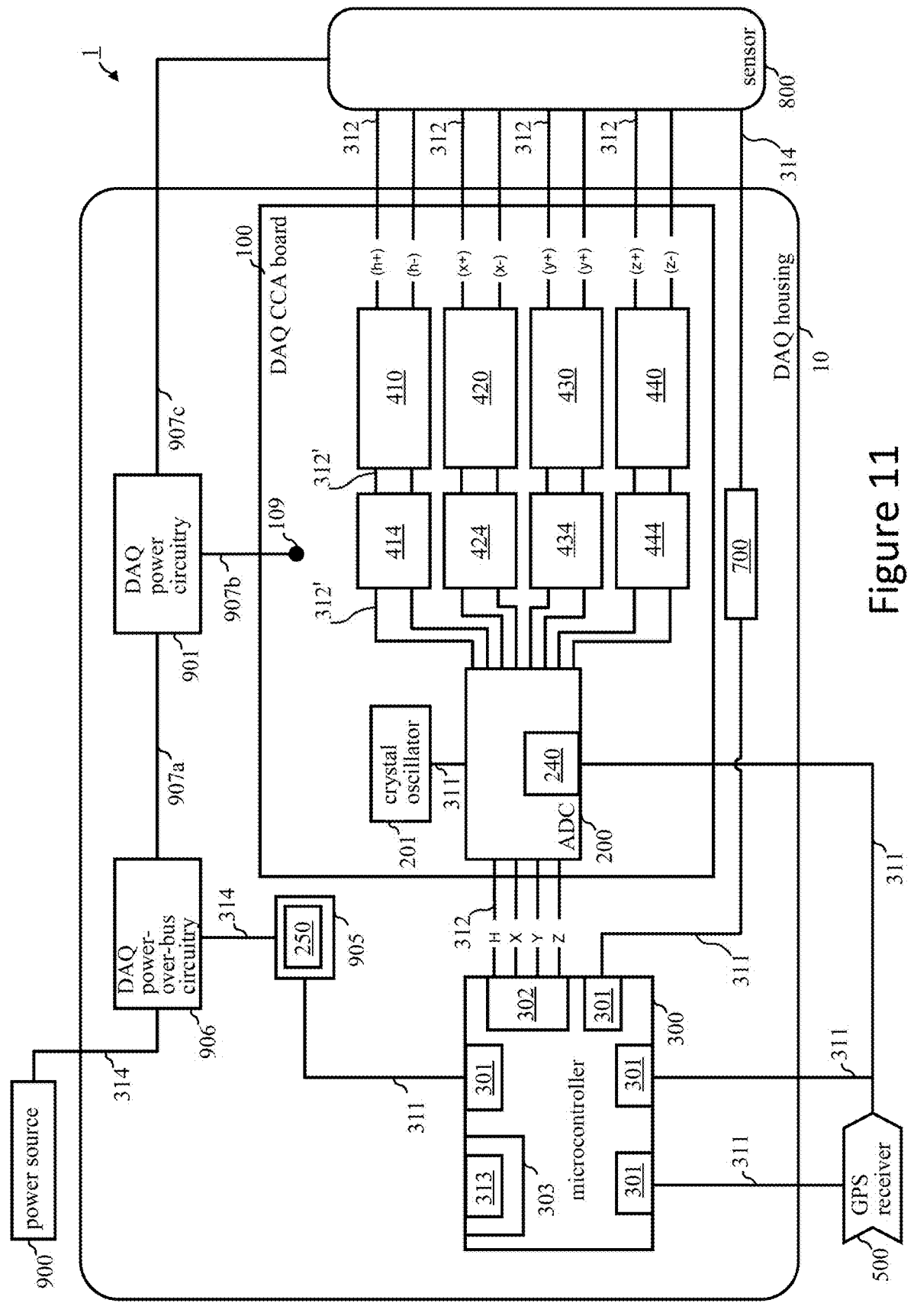
FIG. 11 is a schematic diagram of a DAQ system having an external power source which may be disconnected such that the DAQ system may be connected to the exemplary host device shown in FIG. 5, in accordance with certain embodiments of the present disclosure, with exemplary lines representing wiring and cabling that connects components of the DAQ system.
Figure 12:
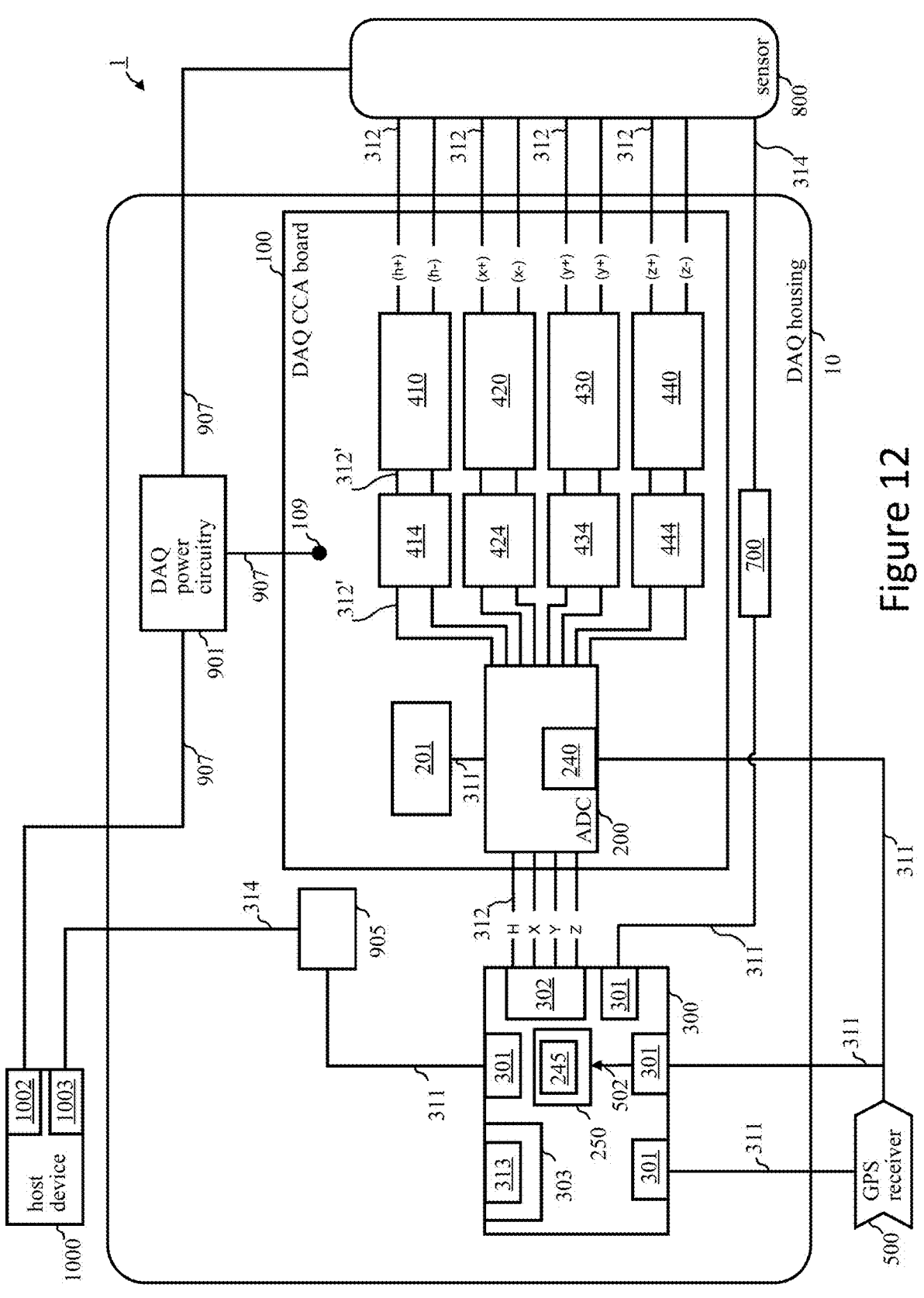
FIG. 12 is a schematic diagram of a DAQ system connected to a host device that supplies power to the DAQ system, in accordance with certain embodiments of the present disclosure, with exemplary lines representing wiring and cabling that connects components of the DAQ system.

FIG. 5 illustrates exemplary components, circuitry and devices for an embodiment of a host device 1000, which may be further implemented as the host devices 1000 shown in FIGS. 16-22, that may be adapted to communicate with and power a DAQ system 1 such as the exemplary DAQ systems 1 shown in FIGS. 11-12. The host device 1000 may comprise a switch 1019 adapted to transmit a switch command 1021 to host-power circuitry 1007 via host-enable circuitry 1020. The host-power circuitry 1007 may be adapted to receive host-source power 1012 from a host-power source 1002, which may be recharged via a host solar-recharge system 1010. The host-power source 1002 may further transmit host-source power 1012 to host-to-DAQ power circuitry 1013, which may be adapted to receive the switch command 1021 from the host-enable circuitry 1020. The host-to-DAQ power circuitry 1013 may transmit adjustable host power 1014 to host power-over-bus circuitry 1016, which may be connected to a payload reset relay 1017 via electrical wiring 907 in accordance with certain embodiments. The payload reset relay 1017 may be adapted to transmit the adjustable host power 1014 via a host cable 1018, such as a RS-485 bus 314 or any other power-and-data cable 1018 or power-over-bus cable 1018, which may traverse through a tether 3 and be adapted to connect to a DAQ system 1 such as the exemplary DAQ systems 1 shown in FIG. 12. In some embodiments, the power-over-bus circuitry 1016 may be adapted to transmit the adjustable host power 1014 via the host cable 1018 to a DAQ system 1.

As further shown in FIG. 5, having received the switch command 1021 for starting the host device 1000 and the host-source power 1012 from the host-power source 1002, the host-power circuitry 1007 may be adapted to transmit host-circuitry power 1008 to host-power contact point 1009 integrated on host-communications circuitry 1003, which may be embedded on the host circuit card assembly (CCA) board 1001 mounted within or on the host device 1000. The host-communications circuitry 1003 of the host device 100 may be connected to the GPS receiver 500 and adapted to receive GPS data 224 and PPS signals 501 via UART ports 301 which may be integrated on a single board computer (SBC) 1011 mounted on the host power-and-communication CCA board 1001. Accordingly, the host-communications circuitry 1003 may comprise the SBC 1011. In an embodiment, the GPS-to-host UART port 301 may be integrated onto a host power-and-communication CCA board 1001 without a SBC 1011.

The SBC 1011 may comprise a computer device built on a circuit board, which may have microprocessor(s), memory, and input/output (I/O) components, that may use a modified version of commercially available device such as ODROID™ boards or Raspberry Pi® boards that are customized and adapted in accordance with the circuitry described in the present disclosure. While such implementations of a SBC 1011 may address SWaP requirements in certain embodiments having a host device 1000 small enough to be undetectable and lightweight, an embodiment may comprise computer general purpose computers having separate components connected to a central circuit board through cables and/or buses. In some embodiments, a microcontroller 300 may be implemented in place of a SBC 1011 for operating host-communications circuitry 1003.

In accordance with certain embodiments, the SBC 1011 of the host device 1000 may further comprise another UART port 301, an USB port 305 and a general-purpose input/output (GPIO) port 306. This second UART port 301 may be adapted to connect to an UART bus 311, which may be connected to the host-to-DAQ directed transceiver 1006 that is connected to the host power-over-bus circuitry 1016 via a RS-485 bus cable 314. The SBC 1011 and the host power-over-bus circuitry 1016 may communicate and exchange communication data/signals 4 in both directions. In some embodiments, the GPIO port 306 may also handle both incoming and outgoing digital signals. As shown in FIG. 5, the GPIO port 306 may connect to a GPIO connector 316, and be adapted to transmit data and signals to a buffering circuit 414. This host buffering circuit 414 may be connected to the payload reset relay 1017 via a RS-485 bus cable 314. The buffering circuit 414 may transmit communication signals 4 to the payload reset relay 1017 or the host power-over-bus circuitry 1016. The host antennae 1004 of a host device 1000, as shown in FIG. 2, may be connected via electrical wiring 907 to a host communications device 1005 such as a radio transceiver 1005 which may be mounted on, or integrated within, the host device 1000. As illustrated in FIG. 5, the host-radio device 1005 may be connected via a USB cable 315 to the USB port 305 of the SBC 1011 for the host device 1000. Communication signals 4 may be transmitted from the USB port 305 to the host antennae 1004, which may transmit the communication signals 4 as radio frequency (RF) or satellite signals 4 to remote systems or devices 5 as shown in FIGS. 1 and 2.

Figure 6:
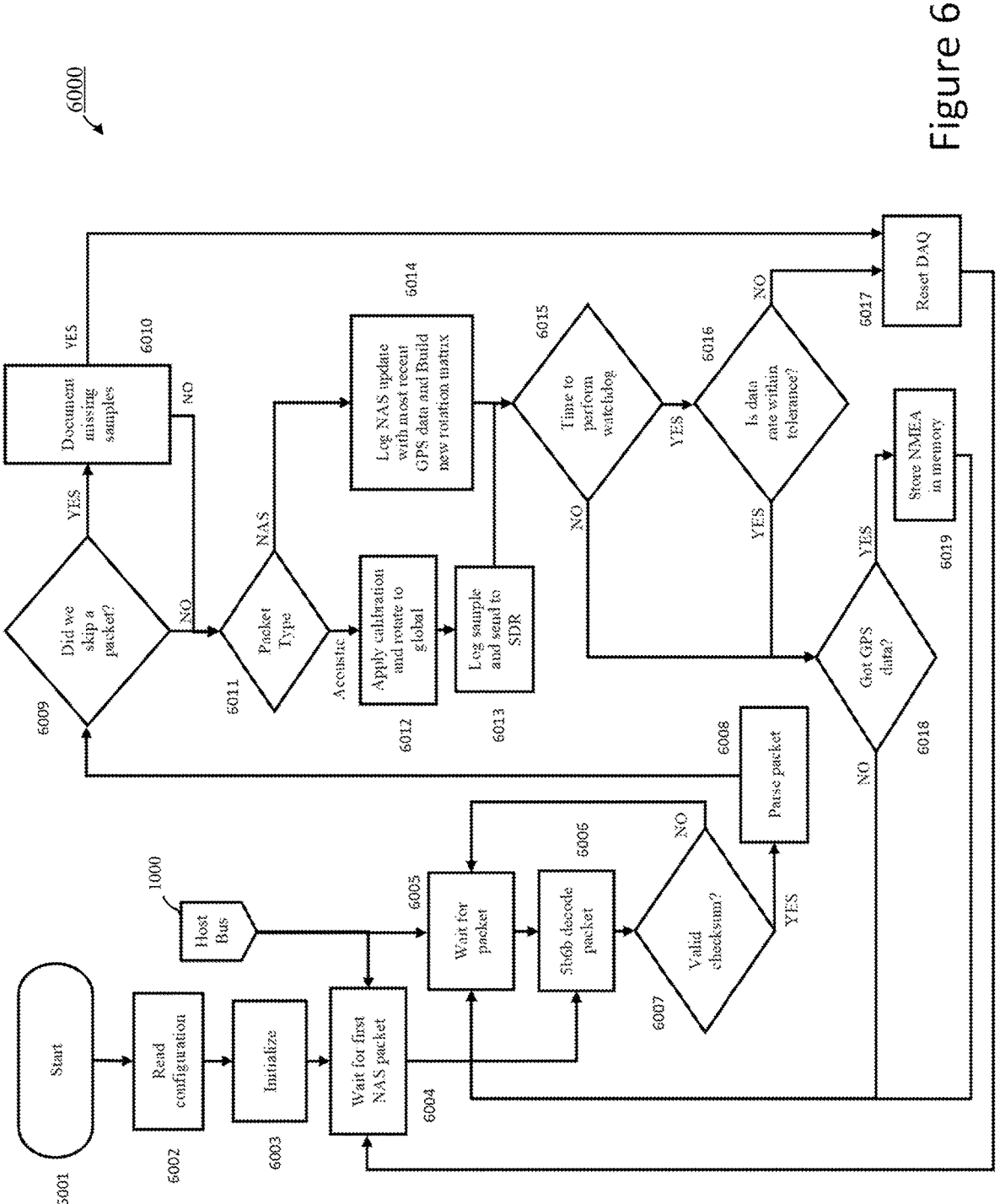
FIG. 6 is a flowchart illustrating exemplary steps of a method for operating a host device connected to a DAQ system, in accordance with certain embodiments of the present disclosure.

As shown in FIG. 6, an embodiment of a host device 1000 may be operated by first starting or powering on the host device 1000 as illustrated by the initial step [block 6001] which may comprise receiving a switch command 1021 from a switch 1019 that may be transmitted to host-power circuitry 1007 via host-enable circuitry 1020 as shown in FIG. 5. Further, the method of operating the host device 1000 may include the steps of reading a predetermined configuration [block 6002], initialization [block 6003], and waiting for a first NAS packet [block 6004]. The method may include receiving a NAS packet via a host bus [block 6005], and decoding the packet [block 6006] which may comprise a 5B/6B decoding method [block 6006]. Further, the method may include the steps of comparing a checksum with the decoded packet [block 6007], and parsing the decoded packet [block 6008]. The method may comprise the steps of receiving an indication that a packet was skipped [block 6009], and recording the missing samples based on the skipped packet(s) [block 6010]. Based a negative indication received via the step of receiving an indication of skipped packet(s) [block 6009], the method may further comprise receiving a packet-type indication [block 6011]. The packet-type indication may comprise NAS or acoustic packet-types. Only in the case of acoustic packet-types, the method may comprise the steps of calibrating and rotating global coordinates [block 6012] and logging and transmitting received samples to a software-defined radio (SDR) receiver [block 6013]. Alternatively, only in the case of NAS packet-types, the method may comprise the steps of logging the NAS packet with GPS data 502 and generating a new rotation matrix [block 6014].

As shown in FIG. 6, in either case after the respective logging steps [blocks 6013, 6014], the method may comprise the steps of monitoring the samples received from the DAQ system 1 [block 6015] and comparing data rate with a predetermined tolerance [block 6016]. When the data rate of the received samples is outside a predetermined tolerance, a reset command may be transmitted to the DAQ system 1 [block 6017]. Otherwise, the method may comprise the step of receiving GPS date 502 [block 6018]. If this step fails, and then the method repeats the steps starting with the step of waiting for a packet [block 6004]. Otherwise, the method comprises the step of storing the GPS date 502 with the samples in memory medium 600 [block 6019], and then repeating the steps starting with the step of waiting for a first packet [block 6003]. In accordance with some embodiments, the GPS date 502 may comprise National Marine Electronics Association (NMEA) formatted GPS data 502. Other GPS formats may be utilized, such as SEM, YUMA, RINEX, SINEX, TLE, Ublox and others known in the art.

Figure 7:
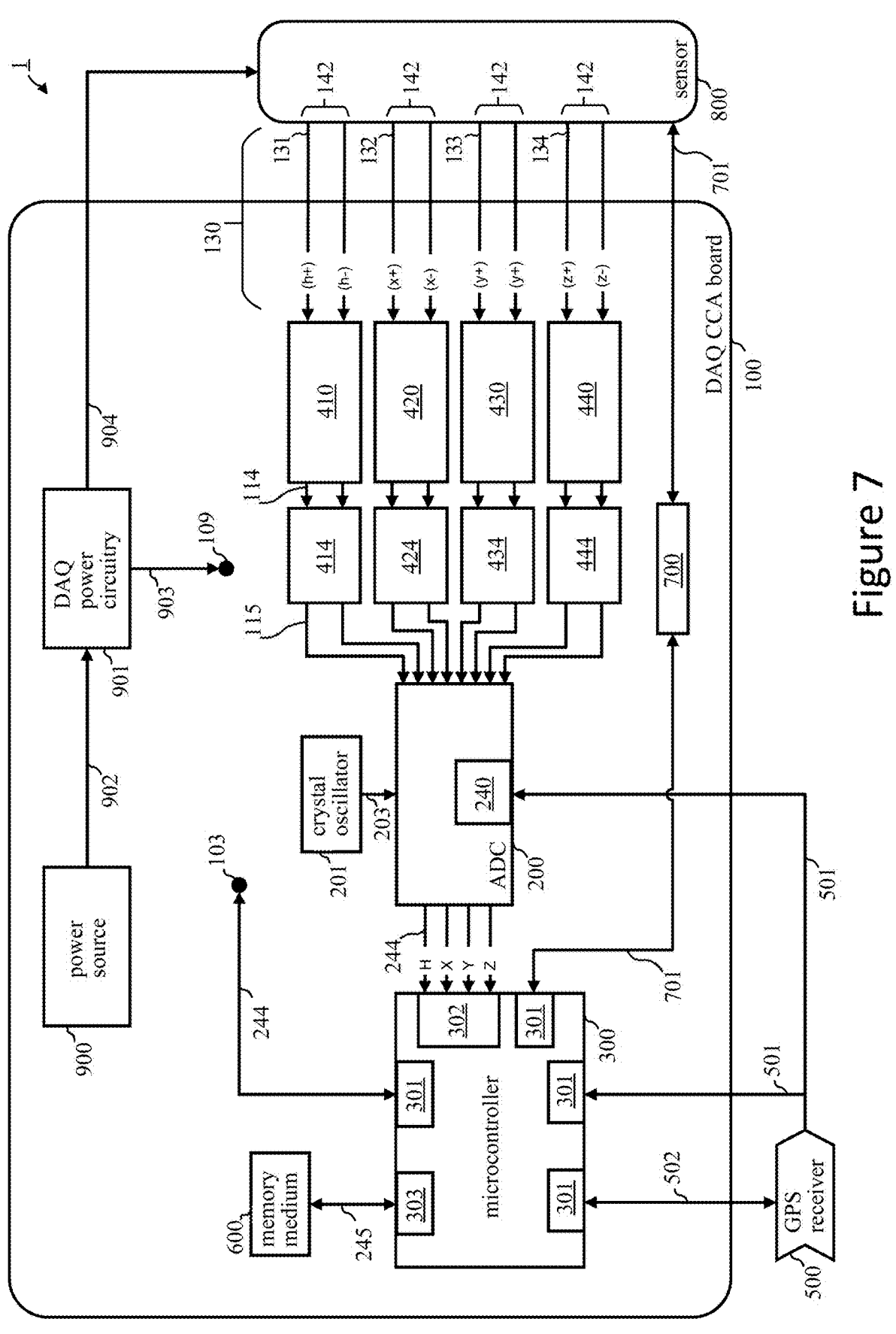
FIG. 7 is a schematic diagram of a DAQ system implemented on a single circuit card assembly (CCA) board and engaged with a GPS receiver and a sensor, in accordance with certain embodiments of the present disclosure, with exemplary arrows representing the directional flow of signals, data and power.
Figure 8:
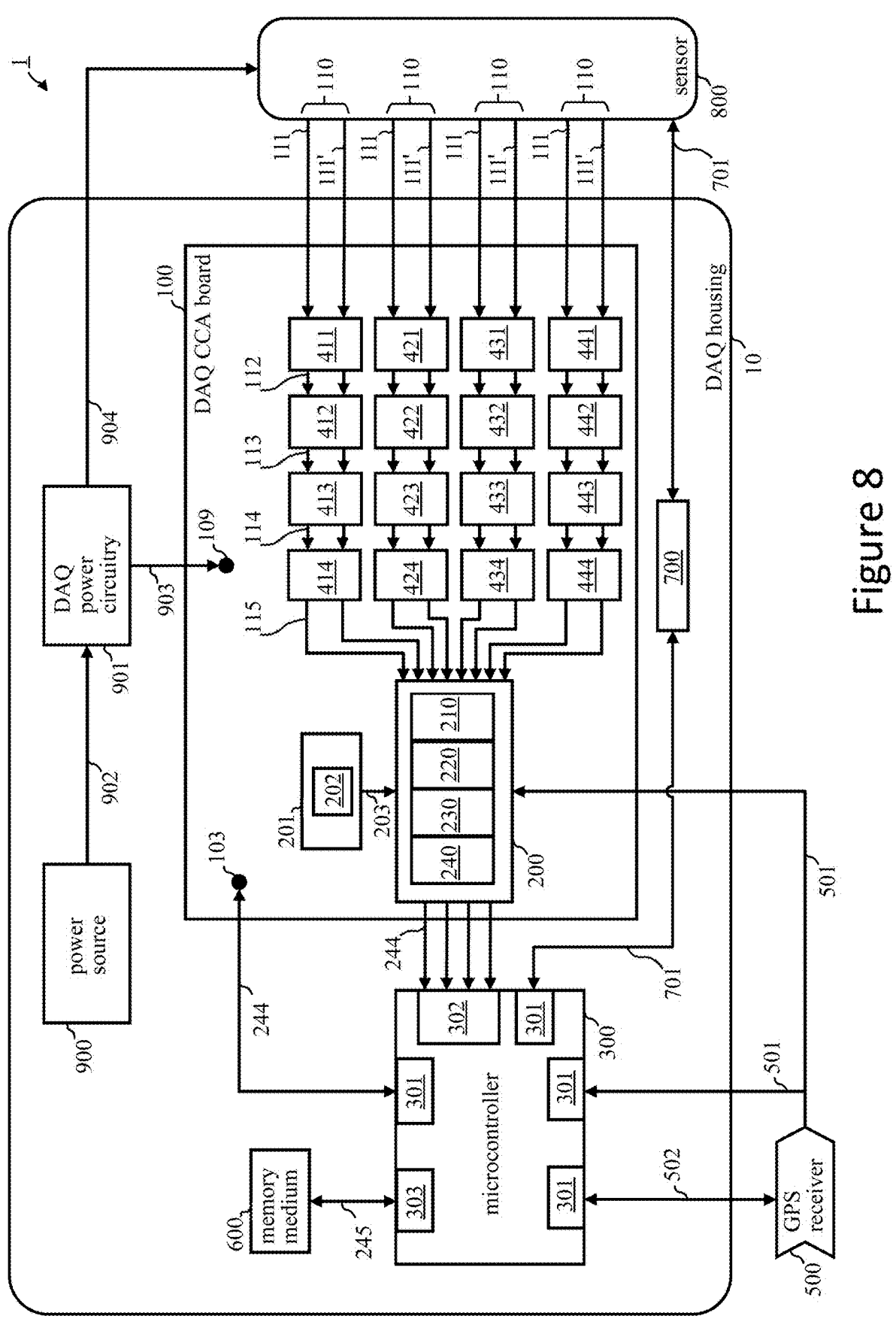
FIG. 8 is a schematic diagram of a DAQ system implemented within a housing having a microcontroller in communication with an ADC and four data channels integrated on a separate CCA board that is engaged with a GPS receiver and a sensor, in accordance with certain embodiments of the present disclosure, with exemplary arrows representing the directional flow of signals, data and power.

As illustrated in FIG. 7, in accordance with certain embodiments of the present disclosure, the DAQ system 1 may comprise a DAQ circuit card assembly (CCA) board 100 that includes an analog-to-digital converter (ADC) 200. The ADC 200 and its circuitry may be mounted, embedded or integrated on the DAQ CCA board 100. In some embodiments, the DAQ system 1 may further comprise a microcontroller 300 that may be mounted, embedded or integrated on the same CCA board 100. In an embodiment, the microcontroller 300 may be implemented as a standalone unit or on a second CCA board (not shown) located within the housing 10 (shown in FIG. 8) of the DAQ system 1. As shown in FIG. 8, the ADC 200 located on the CCA board 100 may connect to, and communicate with, the microcontroller 300.

Figure 10:
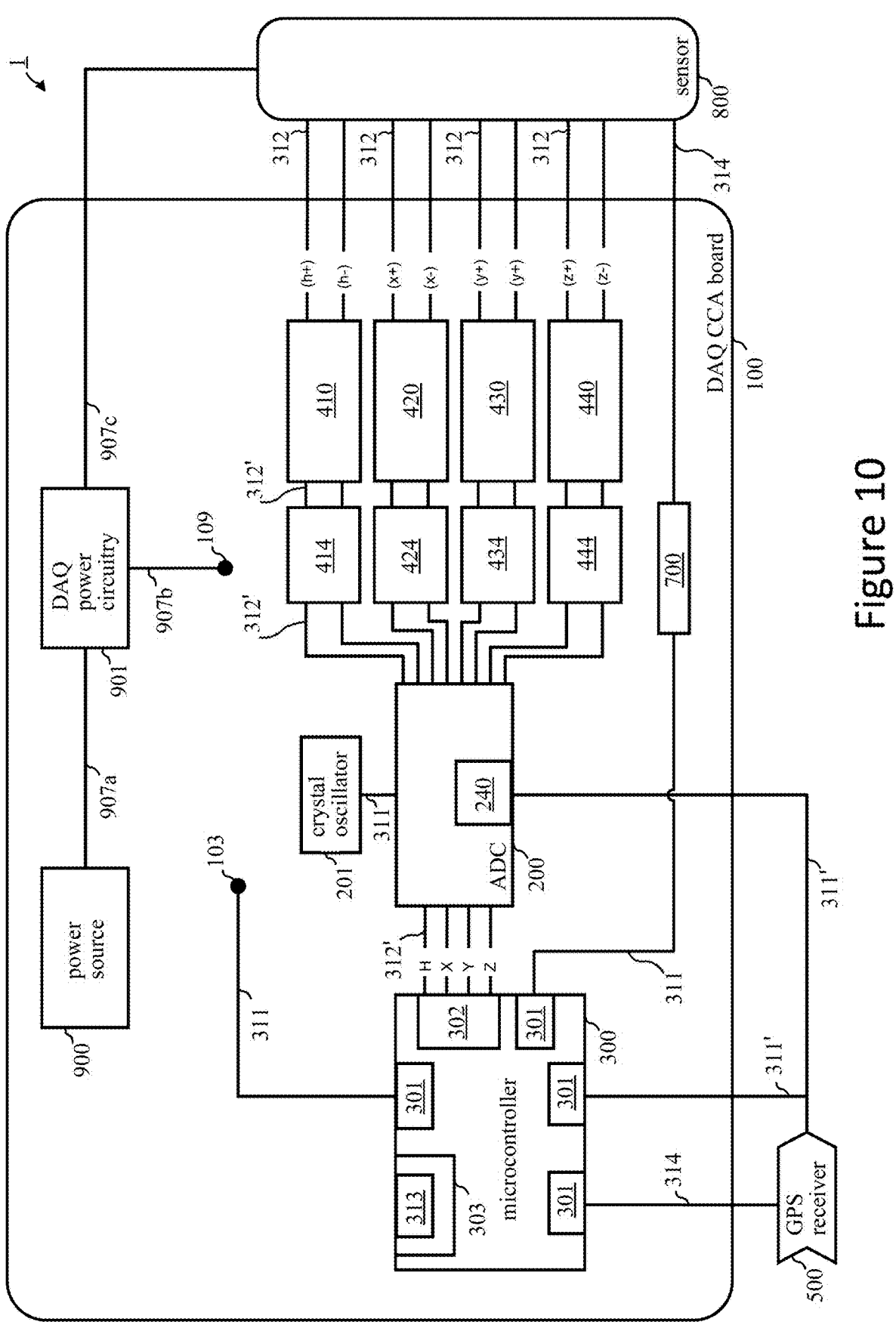
FIG. 10 is a schematic diagram of a DAQ system with exemplary lines representing wiring and cabling that connects components of the DAQ system, in accordance with certain embodiments of the present disclosure.

The arrows illustrated in FIGS. 7 and 8 represent the directional flow of signals, data or power via the wiring, cabling and circuitry shown in FIG. 10, as further discussed herein. Referring back to FIG. 7, the CCA board 100 may comprise the microcontroller 300 such that the ADC 200 is integrated with the microcontroller 300 on the same CCA board 100. The data/signals transmitted between the ADC 200 and the microcontroller 300 may traverse circuitry and traces 312' embedded in the CCA board 100.

Power circuitry 901 may also be integrated on the same CCA board 100. While FIG. 7 illustrates the power circuitry 901 connected to a power source 900 integrated on the CCA board 100, the location of the power source 900 in relation to the CCA board 100 and its components may vary as further described in other embodiments disclosed herein. For example, as illustrated in FIG. 8, the power source 900 may be located within the housing 10 of the DAQ system 1 and may be connected to the CCA board 100 via the power circuitry 901. The housing 10 may comprise a capsule housing 10' such that the DAQ system 1 may maintain a neutral buoyancy in water. In an embodiment, thrusters and propulsion systems may be incorporated into the capsule housing 10', such as the propeller mounted on the submarine shown in FIG. 1. In certain embodiments, the capsule housing 10' lacks any thrusters, propellers and propulsion systems and may be adapted to float and/or be towed via a tether 3 as shown in FIG. 1. In accordance with the embodiments shown by in FIGS. 7 and 8, the power circuitry 901 may receive source power 902 from the power source 900, and supply DAQ power 903 to the CCA board 100. In some embodiments, the power circuitry 901 may filter and regulate the source power 902. Based on the source power 902, adjustable sensor power 904 may be generated by the power circuitry 901 and supplied to a sensor 800 that is connected to the CCA board 100.

In certain embodiments, the CCA board 100 may receive digital signals 701 from the sensor 800 via a sensor transceiver 700 that may also be integrated on the CCA board 100. In some embodiments, the CCA board 100 may simultaneously receive a plurality of sensor data 130 from the sensor 800. In an embodiment, the sensor data 130 comprises the analog signals 111 generated by the sensor 800. The analog signals 111 may be based on acoustic signals 2 detected by the sensor 800. The analog signals 111 may be received by the DAQ system 1 as pairs of differential signals 110, which may comprise pairs of inverted analog signals 111' having opposite/reversed polarities or phase-shifted by 180 degrees. In an embodiment, the DAQ system 1 may generate pairs of differential signals 110 based on analog signals 111 received as common or single-ended signals. The pairs of analog signals 111 processed by the DAQ system 1 may be bipolar or unipolar. In some embodiments, the DAQ system 1 may utilize synthetically generated analog signals 111 to simulate underwater acoustic applications. For example, the present disclosure may be implemented for calibrating the DAQ system 1 by processes synthetically generated acoustic signals 2 that simulate acoustic signals 2 that may be detected by a vector sensor 800 submerged underwater.

As shown in FIG. 8, the analog signals 111 may be received as pairs of differential signals 110 from the sensor 800, and may be conducted through the CCA board 100 and processed by each circuitry 411, 412, 413, 414 separately as differential signals 110 comprising pairs of processed analog signals 111, such as: pairs of filtered analog signals 112, pairs of unipolar polarity signals 113, pairs of scaled analog signals 114, and pairs of buffered signals 115. In some embodiments, the sensor data 130 comprises multiple sets of the received analog signals 111 representing audio/phonic and directional properties as illustrated in FIG. 7 and disclosed herein. In an embodiment, each differential pair of analog signals 111 may comprise corresponding sets of bipolar polarity data 142 that may include datasets having positive values and negative values. For example, a set of bipolar polarity data 142 may reflect a voltage range (not shown) between −V and V volts. In accordance with some embodiments, bipolar polarity datasets 142 for the analog signals 111 may be converted to unipolar polarity signals 113 as disclosed herein.

As shown in FIG. 7, four sets of sensor data 130 may be received that comprise corresponding sets of hydrophone data 131, x-axis data 132, y-axis data 133, and z-axis data 134. The x-axis data 132, y-axis data 133, and z-axis data 134 may be based on a monitored direction of the sensor 800 in accordance with some embodiments. The received sensor data 130 may traverse four data channels 400. The four data channels 400 may be integrated on the CCA board 100, and may comprise a first, second, third and fourth sensor-data channel 410, 420, 430, and 440. The first sensor-data channel 410 may be adapted to filter and adjust the hydrophone data 131. The second sensor-data channel 420 may be adapted to filter and adjust the x-axis data 132. The third sensor-data channel 430 may be adapted to filter and adjust the y-axis data 133. The fourth sensor-data channel 440 may be adapted to filter and adjust the z-axis data 134. In an embodiment, the four data channels 400 comprises the signal-receiving circuitry 408 shown in FIG. 3. In some embodiments, a signal-receiving circuitry 408 may be configured to receive the analog signals 111, and the signal-receiving circuitry 408 is connected to the anti-alias filter circuitry 411.

As shown in FIG. 8, each of the four data channels 400 may comprise a plurality of circuitry integrated on the CCA board 100. Such circuitry may be adapted to prepare, preprocess or condition the analog signals 111 or sensor data 130 for conversion into digitized signals 121 by the ADC 200 as described herein. This circuitry integrated on the CCA board 100 may comprise anti-alias filter circuitry 411, bipolar-unipolar conversion circuitry 412, analog-scaling circuitry 413, and buffering circuitry 414. In some embodiments, as shown in FIG. 8, each circuitry 411, 412, 413, 414 may be implemented as separate circuits on the CCA board 100. Various combinations of each circuitry may be integrated by the same circuits on the CCA board 100, in accordance with certain embodiments. For example, the bipolar-unipolar conversion circuitry 412 and the analog-scaling circuitry 413 may be integrated on the same circuits embedded in the CCA board 100. As shown in FIG. 7, the buffering circuitry 414 may be implemented separately from the data channels 400 that may comprise the anti-alias filter circuitry 411, the bipolar-unipolar conversion circuitry 412, and the analog-scaling circuitry 413.

In certain embodiments, the ADC 200 may comprise sampling circuitry 210 that may generate digitized signals 121 based on a sampling of analog signals 111 that are first filtered, scaled and buffered by the circuitry of the data channels 400 as described herein. The ADC 200 may be adapted to simultaneously receive buffered signals 115 from the multiple data channels 400. In accordance with some embodiments, the number of such sets of data channels 400 integrated on the CCA board 100 that are utilized by the DAQ system 1 may be based on the received sensor data 130. As shown in FIG. 7, the ADC 200 may simultaneously receive and process four sets of buffered signals 115 transmitted by the four data channels 400 that preprocess/condition the analog signals 111 or sensor data 130.

Figure 9:
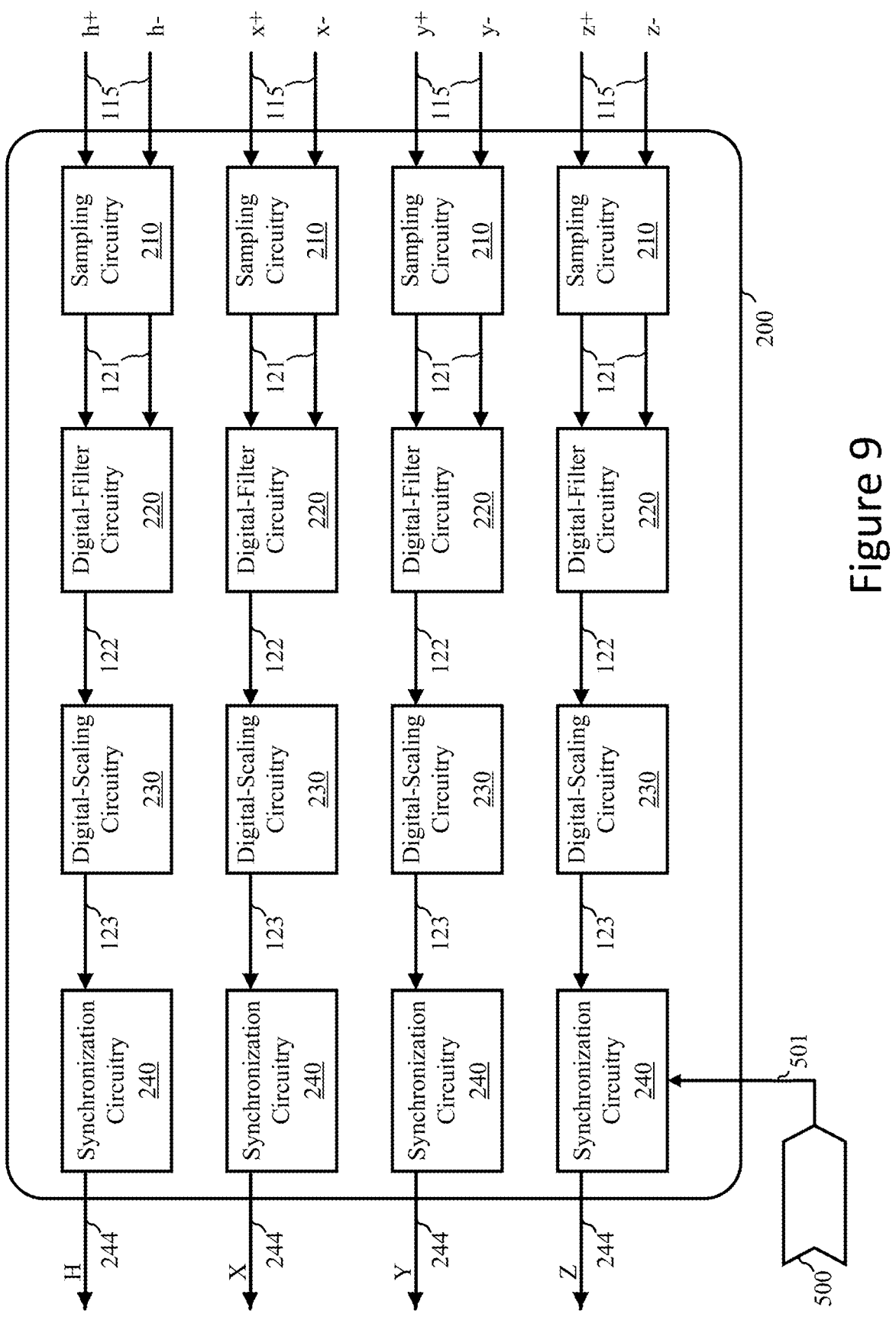
FIG. 9 is a schematic diagram of exemplary circuitry for an ADC of a DAQ system, in accordance with certain embodiments of the present disclosure, with exemplary arrows representing the directional flow of signals and data.

In certain embodiments, as shown in FIG. 8, the ADC 200 may include digital-filter circuitry 220 and digital-scaling circuitry 230 in addition to the sampling circuitry 210. Referring to FIG. 9, the digital-filter circuitry 220 may filter the digitized signals 121 that are generated by the sampling circuitry 210. Accordingly, the digital-filter circuitry 220 may generate filtered digital signals 122 based on the digitized signals 121. The digital-scaling circuitry 230 may generate scaled digital signals 123 based on the filtered digital signals 122, as described herein.

In some embodiments, each one of the data channels 400 may comprise anti-alias filter circuitry 411, bipolar-unipolar conversion circuitry 412, analog-scaling circuitry 413, and buffering circuitry 414. The four exemplary data channels 400 illustrated in FIG. 7 as the first, second, third and fourth sensor-data channels 410, 420, 430, 440 may comprise the circuits shown in FIG. 8: the anti-alias filter circuits 411, 421, 431, 441 and the bipolar-unipolar conversion circuits 412, 422, 432, 442 and the analog-scaling circuit 413, 423, 433, 443 and the buffering circuits 414, 424, 434, 444. In embodiments where the bipolar-unipolar conversion circuitry 412 and the analog-scaling circuitry 413 are integrated on the same circuits, each one of the analog-scaling circuits 413, 423, 433, 443 may be connected with one of the anti-alias filter circuits 411, 421, 431, 441. As shown in FIGS. 7 and 8, each one of the data channels 400 may also include a buffering circuit 414, 424, 434, 444 connected to the ADC 200. Each one of the buffering circuits 414, 424, 434, 444 may be connected with one of the corresponding analog-scaling circuits 413, 423, 433, 443. As illustrated in FIG. 8, each data channel 400 may include an anti-alias filter circuit 411, 421, 431, 441 and an analog-scaling circuit 413, 423, 433, 443 and a buffering circuit 414, 424, 434, 444 connected to the ADC 200. In certain embodiments, four sets of such data channels 400 may be integrated on the CCA board 100 for separately and simultaneously preprocessing and transferring the four sets of hydrophone data 131, x-axis data 132, y-axis data 133, and z-axis data 134 shown in FIG. 7.

These four sets of sensor data 130 may comprise the four sets of bipolar polarity data 142 represented in FIG. 7 as h+ and h− for the bipolar hydrophone data 131, x+ and x− for the bipolar x-axis data 132, y+ and y− for the bipolar y-axis data 133, and z+ and z− for the bipolar z-axis data 134. The four data channels 410, 420, 430, 440 integrated on the CCA board 100 may process and transmit the four sets of corresponding bipolar polarity data 142. Each data channel 400 may include bipolar-unipolar conversion circuitry 412, 422, 432, 442 that may convert the bipolar polarity datasets 142 for the analog signals 111 to unipolar polarity signals 113, e.g. a voltage range 113' between 0 and a predetermined voltage V.

In accordance with certain embodiments, as shown in FIG. 8, each set of circuitry integrated on the CCA board 100 may be implemented as a plurality of circuits (e.g. circuits 411, 412, 413, 414) in each of the plurality of data channels (e.g. channels 410, 420, 430, 440 shown in FIG. 7) such that each differential pair of analog signals 131, 132, 133, 134 may separately and simultaneously traverse each circuit in each of the four data channels. For example, the first sensor-data channel 410 may integrate an anti-alias filter circuit 411, a bipolar-unipolar conversion circuit 412, an analog-scaling circuit 413, and a buffering circuit 414 while the second sensor-data channel 420 may integrate a corresponding set of circuits 421, 422, 423, 424. Accordingly, the anti-alias filter circuitry 411 integrated on the CCA board 100 may comprise a plurality of anti-alias filter circuits 411, 421, 431, 441 where each such circuit may be implemented in one of the four data channels 410, 420, 430, 440. The analog-scaling circuitry 413 integrated on the CCA board 100 may also comprise a plurality of analog-scaling circuits 413, 423, 433, 443.

The anti-alias filter circuitry 411, 421, 431, 441 may filter analog signals 111. As such, an anti-alias filter circuitry 411 may generate filtered analog signals 112 based on the analog signals 111. An analog-scaling circuitry 413, 423, 433, 443 may generate scaled analog signals 114 based on the filtered analog signals 112, as described herein. In embodiments where the filtered analog signals 112 comprise bipolar polarity datasets 142, a bipolar-unipolar conversion circuitry 412 may convert the filtered analog signals 112 into unipolar polarity signals 113, and the analog-scaling circuitry 413 may generate scaled analog signals 114 based on the filtered unipolar polarity signals 113, as shown in FIG. 8. In some embodiments, an analog-scaling circuitry 413 may include or integrate the bipolar-unipolar conversion circuitry 412. A buffering circuit 414 may process the scaled analog signals 114 to generate buffered signals 115 such that the scaled analog signals 114 are isolated from the ADC 200.

As illustrated in FIG. 9, the ADC 200 may comprise multiple sets of sampling circuitry 210, digital-filter circuitry 220, digital-scaling circuitry 230, and synchronization circuitry 240 that may be adapted to simultaneously receive multiple sets of buffered signals 115. Four sets of buffered signals 115 may comprise differential signals 110 that are represented in FIG. 9 as follows: h+ and h− for buffered signals 115 based on the corresponding hydrophone data 131 shown in FIG. 7; x+ and x− for buffered signals 115 based on the corresponding x-axis data 132 shown in FIG. 7, y+ and y− for buffered signals 115 based on the corresponding y-axis data 133 shown in FIG. 7, and z+ and z− for buffered signals 115 based on the corresponding z-axis data 134 shown in FIG. 7. Accordingly, each set of circuitry 210, 220, 230, 240 of the ADC 200 may be associated to each one of the data channels 400. In an embodiment, the digital-filter circuitry 220 may filter each differential pair of digitized signals 121 to output a corresponding the filtered digital signals 122 having a single value.

Referring to FIG. 9, four sets of circuitry 210, 220, 230, 240 of the ADC 200 may be implemented to further process the four sets of buffered signals 115. Each of the sampling circuitry 210 may generate digitized signals 121 based on the buffered signals 115 that are generated and/or transmitted by the buffering circuitry 414, 424, 434, 444. In certain embodiments, the digital-filter circuitry 220 may filter the digitized signals 121 that are generated by the sampling circuitry 210, as described here.

In some embodiments, bipolar polarity datasets 142 may be received by the ADC 200, and bipolar-unipolar conversion circuitry 412, 422, 432, 442 may be integrated in the digital-filter circuitry 220 or the digital-scaling circuitry 230. In such embodiments, where the buffered signals 115 comprise differential signals 110 that are bipolar, each digital-filter circuitry 220 may further filter the negative values of the bipolar polarity datasets 142 such that the filtered digital signals 122 generated by each digital-filter circuitry 220 may comprise unipolar polarity signals 113 that are transmitted to the digital-scaling circuitry 230. In such embodiments, the data channels 400 connected to the ADC 200 may integrate circuitry in the CCA board 100 without bipolar-unipolar conversion circuitry 412, 422, 432, 442 in accordance with the embodiment represented by FIG. 7.

The filtered digital signals 122 generated by each digital-filter circuitry 220 of the ADC 200 may be transmitted to the digital-scaling circuitry 230, which may generate the scaled digital signals 123 based on the filtered digital signals 122, as described herein. Referring back to FIG. 8, the ADC 200 may be connected to a crystal oscillator 201 (as also shown in FIG. 7), which may comprise an electric oscillator-type circuit 202 that utilizes a piezoelectric resonator for frequency determination of the scaled analog signals 114. In an embodiment, the scaled analog signals 114 may be received by the oscillator-type circuit 202 via the ADC 200 from the analog-scaling circuitry 413, 423, 433, 443.

In an embodiment, the sampling circuitry 210 may generate the digitized signals 121 based on the scaled analog signals 114 that are generated by an analog-scaling circuitry 413, 423, 433, 443. Accordingly, the digitized signals 121 may comprise a digital sampling of the scaled analog signals 114. The analog-scaling circuitry 413, 423, 433, 443 may buffer the analog-scaling circuitry 413, 423, 433, 443 transmitted to the ADC 200.

In accordance with certain embodiments of the present disclosure, as shown in FIG. 9, the ADC 200 may comprise synchronization circuitry 240 that may synchronize Pulse Per Second (PPS) signals 501 with the scaled digital signals 123. In certain embodiments, the PPS signals 501 may be received by one or more of the synchronization circuitry 240 from a GPS receiver 500. In some embodiments, the scaled digital signals 123 may be synchronized with the scaled analog signals 114 or the buffered signals 115 received by the ADC 200, as well as oscillator data 203 received from the oscillator-type circuit 202. In an embodiment, the PPS signals 501 may be synchronized with the scaled analog signals 114 and the scaled digital signals 123 by the synchronization circuitry 240. The synchronization circuitry 240 may generate synchronized signals 244 based on any combination of the signals processed by the DAQ system 1, such as one or more of the following signals: PPS signals 501, analog signals 111, filtered analog signals 112, unipolar polarity signals 113, scaled analog signals 114, buffered signals 115, digitized signals 121, filtered digital signals 122, scaled digital signals 123, and/or sensor data 130.

Four sets of synchronization circuitry 240 may simultaneously generate four sets of synchronized signals 244 that correspond to the four sets of buffered signals 115 received by the ADC 200, in accordance with some embodiments.

The four sets of synchronized signals 244 are represented as H, X, Y and Z in FIG. 9, as follows: H represents the synchronized signals 244 corresponding to the buffered signals 115 that are represented as h+ and h− which are based on the hydrophone data 131 represented as h+ and h− in FIG. 7; X represents the synchronized signals 244 corresponding to the buffered signals 115 that are represented as x+ and x− which are based on the x-axis data 132 represented as x+ and x− in FIG. 7; Y represents the synchronized signals 244 corresponding to the buffered signals 115 that are represented as y+ and y− which are based on the y-axis data 133 represented as y+ and y− in FIG. 7; and, Z represents the synchronized signals 244 corresponding to the buffered signals 115 that are represented as z+ and z− which are based on the z-axis data 134 represented as z+ and z− in FIG. 7.

Referring back to FIG. 7, the microcontroller 300 and the ADC 200 may connect to the GPS receiver 500 and receive the PPS signals 501 from the GPS receiver 500 in accordance with certain embodiments. The GPS receiver 500 and the microcontroller 300 may be further adapted to transmit and/or receive GPS data 502. In some embodiments, the microcontroller 300 may connect to a removable memory medium 600. The microcontroller 300 may connect to a sensor transceiver 700, which may be configured to connect to a sensor 800. The sensor transceiver 700 may digitally communicate with the sensor 800. The sensor transceiver 700 may receive digital signals 701 from the sensor 800, and transmit the digital signals 701 to the microcontroller 300. In an embodiment, the synchronization circuitry 240 (shown in FIG. 7) may generate a synchronized sampling of signals 244 based in part on the digital signals 701.

FIG. 10 illustrates wiring, cabling, circuitry, electronics and components in accordance with certain embodiments of the present disclosure. The microcontroller 300 may comprise a plurality of Universal Asynchronous Receiver Transmitter (UART) interfaces or ports 301, parallel binary unit system (bus) interfaces or ports 302, and Secure Digital Input Output (SDIO) interfaces or ports 303. The microcontroller 300 may comprise four UART ports 301 connected to UART buses 311, a parallel bus port 302 connected to a parallel bus cable 312, and a SDIO port 303 adapted to interface with the memory medium 600 shown in FIG. 7. In some embodiments, the memory medium 600 may be removable such as a Secure Digital (SD) card 313. Accordingly, the microcontroller 300 may be used as an interface of the DAQ system 1 for external input or output (I/O) devices such as the SD card 313. In certain embodiments, the storage circuitry 260 may comprise the SDIO port 303 that interfaces with a removable memory medium 600 comprising the SD card 313. As shown in FIG. 10, the removable SD card 313 may be inserted into the SDIO port 303 on the microcontroller 300.

The UART buses 311 may be adapted to transmit digital communications to and from additional external devices, as well as internal components of the DAQ system 1 such as electronic components embedded on the CCA board 100. As shown in FIG. 10, in certain embodiments, an UART port 301 on the microcontroller 300 may connect via an UART bus 311 to a CCA communication contact point 103 embedded on the DAQ CCA board 100 that may be adapted to transmit and/or receive digital communications, such as the synchronized signals 244 shown in FIG. 7, between the microcontroller 300 and the electronic components embedded on the CCA board 100 such as the data channels 400 and the ADC 200 and its circuitry. In some embodiments, as shown in FIGS. 11 and 12, the UART port 301 may connect to a transceiver 905 via an UART bus 311 to transmit and/or receive digital communications such as the synchronized signals 244 shown in FIG. 7. This transceiver 905 may be adapted to further connect to a RS-485 bus cable 314 that may transmit and/or receive the digital communications. As shown in FIG. 11, this RS-485 bus cable 314 may be connected to DAQ power-over-bus circuitry 906 as further described herein. In accordance with certain embodiments, this RS-485 bus cable 314 may be also connected to host-communications circuitry 1003 of a host device 1000 as shown in FIG. 12 and further described herein. This transceiver 905 may comprise a DAQ-to-host directed transceiver 905 having transmission circuitry 250 of the DAQ system 1 adapted to communicate with the host device 1000 as described herein.

Referring back to FIG. 10, an UART port 301 on the microcontroller 300 may connect via an UART bus 311 to a sensor transceiver 700 to transmit and/or receive digital signals 701 shown in FIG. 7. This transceiver 700 may be further adapted to connect to a RS-485 bus cable 314 adapted to further transmit and/or receive the digital signals 701 to a sensor 800 as described herein. The microcontroller 300 may further comprise an UART port 301 adapted to connect to an UART bus 311 that may connect to a GPS receiver 500 so that GPS data 502 shown in FIG. 7 may be transmitted and/or received between the microcontroller 300 and the GPS receiver 500. Further, the GPS receiver 500 may be adapted to connect to an UART bus 311 or a RS-485 bus 314 which may be adapted to transmit GPS data 224 and PPS signals 501 shown in FIG. 7. Such an UART bus 311 may comprise a GPS wire 311', and be connected to an UART port 301 on the microcontroller 300 and/or synchronization circuitry 240 on the ADC 200 as illustrated in FIG. 10. The parallel bus port 302 (shown in FIG. 7) on the microcontroller 300 may be connected to a plurality of parallel bus cables 312, as shown in FIG. 11, which may be connected to the ADC 200 and adapted to transmit the synchronized signals 244 shown in FIG. 7. When integrated on the same CCA board 100, the microcontroller 300 and the ADC 200 may be connected via parallel traces or tracks 312', as shown in FIG. 10.

In an embodiment, the ADC 200 may comprise an adapted version of an AD7768-4 analog device offered by Analog Devices Inc. that is customized and adapted in accordance with the circuitry described in the present disclosure. The configuration register and flag bits for an ADC 200 may be set to select a predetermined mode, such as a serial digital interface (SDI) configuration for the analog-to-digital (A/D) conversion such that digitized signals 121 may efficiently transfer across a two-wire bus 314' having the length of a tether 3. The CCA board 100 with the microcontroller 300 may comprise a modified version of Teensy® CCA development boards that are distributed by Pjrc.com LLC, which may be tailored and adapted in accordance with the improvements described in the present disclosure. The host power-and-communication CCA board 1001 of the host device 1000 shown in FIG. 5 may also be implemented on a Teensy® board 100 customized in accordance with the present disclosure. In certain embodiments, a particular Teensy® board 100 may be selected to have a dimension of less than three inches in length and less than one inch in width.

The UART buses 311 and UART ports 301 may be based on a predetermined protocol, or set of rules, for exchanging serial data between any of the components of the DAQ system 1. In certain embodiments, each UART bus 311 may comprise two wires between a transmitter and a receiver that are adapted to transmit and receive data or signals in both directions. Both ends of an UART bus 311 have a common ground connection. The transfer speeds for data or signals transmitted across an UART bus 311 may be based on standard UART rates. In some embodiments, the parallel bus cables 312 may also be used for the transmission of data and/or signals between any of the components of the DAQ system 1. In embodiments transmitting data in parallel through embedded circuitry within a CCA board 100, the parallel buses 312 may comprise parallel tracks, electrical pathways, circuit traces 312' comprising a thin line of conductive material such as copper that carries the signal and power through the surrounding non-conducive substrate. In certain embodiments, electrical wires 907*a*, 907*b*, 907*c* may be used to transmit the source power 902, DAQ power 903 and adjustable sensor power 904 shown in FIG. 7, respectively. As shown in FIG. 10, a DAQ-power electric wire 907*b* may connect the power circuitry 901 to a CCA power contact point 109 embedded on the DAQ CCA board 100 in order to transmit the DAQ power 903 to the electronic components of the DAQ system 1. A sensor-power electric wire 907*c* may connect the power circuitry 901 to a sensor 800 in order to transmit the adjustable sensor power 904 shown in FIG. 7.

As shown in FIG. 11, the power source 900 may be located outside the housing 10 of the DAQ system 1. Such a power source 900 may comprise a power-source housing located near or adjacent to the housing 10 of the DAQ system 1, e.g. the power source 900 may be mounted on the same apparatus that comprises, includes or directly supports the DAQ system 1 in accordance with certain embodiments. The power circuitry 901 of the DAQ system 1 may be connected to power-over-bus circuitry 906 of the DAQ system 1 via a source-power electric wire 907*a*. The power-over-bus circuitry 906 may be adapted to receive source power 902 from the power source 900 via a RS-485 bus cable 314, and to further transmit the received source power 902 to the power circuitry 901 via the source-power electric wire 907*a*. In certain embodiments, this RS-485 bus cable 314 may be further adapted to receive and/or transmit digital communications signals between the DAQ power-over-bus circuitry 906 and the power source 900. In an embodiment, a duty-cycle for the DAQ power-over-bus circuitry 906 may be reduced to a predetermined level, such as 50%, based on a variable resistor setting. In an embodiment, a regulator or the host-to-DAQ power circuitry 1013 within the host device 1000 may buck or boost the voltage of the host-source power 1012 such that the adjustable host power 1014 having an increased voltage may be transmitted down the host cable 1018 within the tether 3 than is supplied by a host-power source 1002.

In some embodiments, the DAQ power-over-bus circuitry 906 may be further connected to another RS-485 bus cable 314 connected to the DAQ-to-host directed transceiver 905 within the housing 10 of the DAQ system 1. This RS-485 bus cable 314 may be adapted to receive and/or transmit digital communications between the DAQ power-over-bus circuitry 906 and the transceiver 905, which may be connected to the microcontroller 300 via an UART bus 311. The transceiver 905 may comprise transmission circuitry 250 adapted to package the digital communications for transmission between the DAQ power-over-bus circuitry 906 and the microcontroller 300. The microcontroller 300 may transmit and/or receive the digital communications, such as the synchronized signals 244 shown in FIG. 7, via an UART port 301 embedded in the microcontroller 300.

The RS-485 bus cable 314 that is connected to the power source 900 as shown in FIG. 11 may be adapted to transmit host-source power 1012 from a host device 1000 shown in FIG. 5. As such, the RS-485 bus cable 314 may comprise a power-over-bus cable. For example, this RS-485 bus cable 314 may comprise the host cable 1018 shown in FIG. 5 that may pass through the interior of a tether 3 in accordance with certain embodiments. The RS-485 bus cable 314 may be unplugged from the power source 900 shown in FIG. 11, and then plugged into the host device 1000 to receive host-source power 1012 from a host-power source 1002 shown in FIG. 5.

Referring to FIG. 12, the host-power source 1002 may be mounted on or within a host device 1000. In an embodiment, the host device 1000 may be located within the same housing 10 as the DAQ system 1. As shown in FIG. 12, the host device 1000 may be located outside the housing 10 of the DAQ system 1. As such, in accordance with certain embodiments, the host device 1000 may comprise an apparatus that is separate from the apparatus that comprises, includes or directly supports the housing 10 of the DAQ system 1.

A tether 3 may connect the host device 1000 to the housing 10 of the DAQ system 1. An electric wire 907 and/or a RS-485 bus cable 314 traverse the tether 3 as described herein. Alternatively, the host device 1000 may be coupled to the DAQ system 1 without a tether 3. In some embodiments, the power circuitry 901 of the DAQ system 1 may be connected to the host-power source 1002 via an electric wire 907. The host-communications circuitry 1003 of the host device 1000 may be connected to a RS-485 bus cable 314, which may be connected to the DAQ-to-host directed transceiver 905 within the housing 10 of the DAQ system 1.

The RS-485 bus cable 314 may be adapted to receive and/or transmit digital communications between the host-communications circuitry 1003 of the host device 1000 and the DAQ-to-host directed transceiver 905, which may be connected to the microcontroller 300 via an UART bus 311. In certain embodiments, this RS-485 bus cable 314 that is connected to the DAQ-to-host directed transceiver 905 may be further connected to the power circuitry 901 and the host-power source 1002, and may be further adapted to transmit from the host-power source 1002 both host-source power 1012 and digital communications such as a power indicator as described herein. In an embodiment, this DAQ-to-host directed transceiver 905 may comprise transmission circuitry 250 adapted to package the digital communications, such as the synchronized signals 244, into synchronized data packets 245 shown in FIG. 7, for transmission between the host device 1000 and the microcontroller 300. The microcontroller 300 may transmit and/or receive the digital communications via an UART port 301 embedded in the microcontroller 300. In some embodiments, as shown in FIG. 12, the transmission circuitry 250 may be embedded on the microcontroller 300. The transmission circuitry 250 may generate and synchronize a data packet 245 based on the synchronized signals 244, and transmit the synchronized data packet 245 to the host device 1000 via the DAQ-to-host directed transceiver 905.

Figure 13:
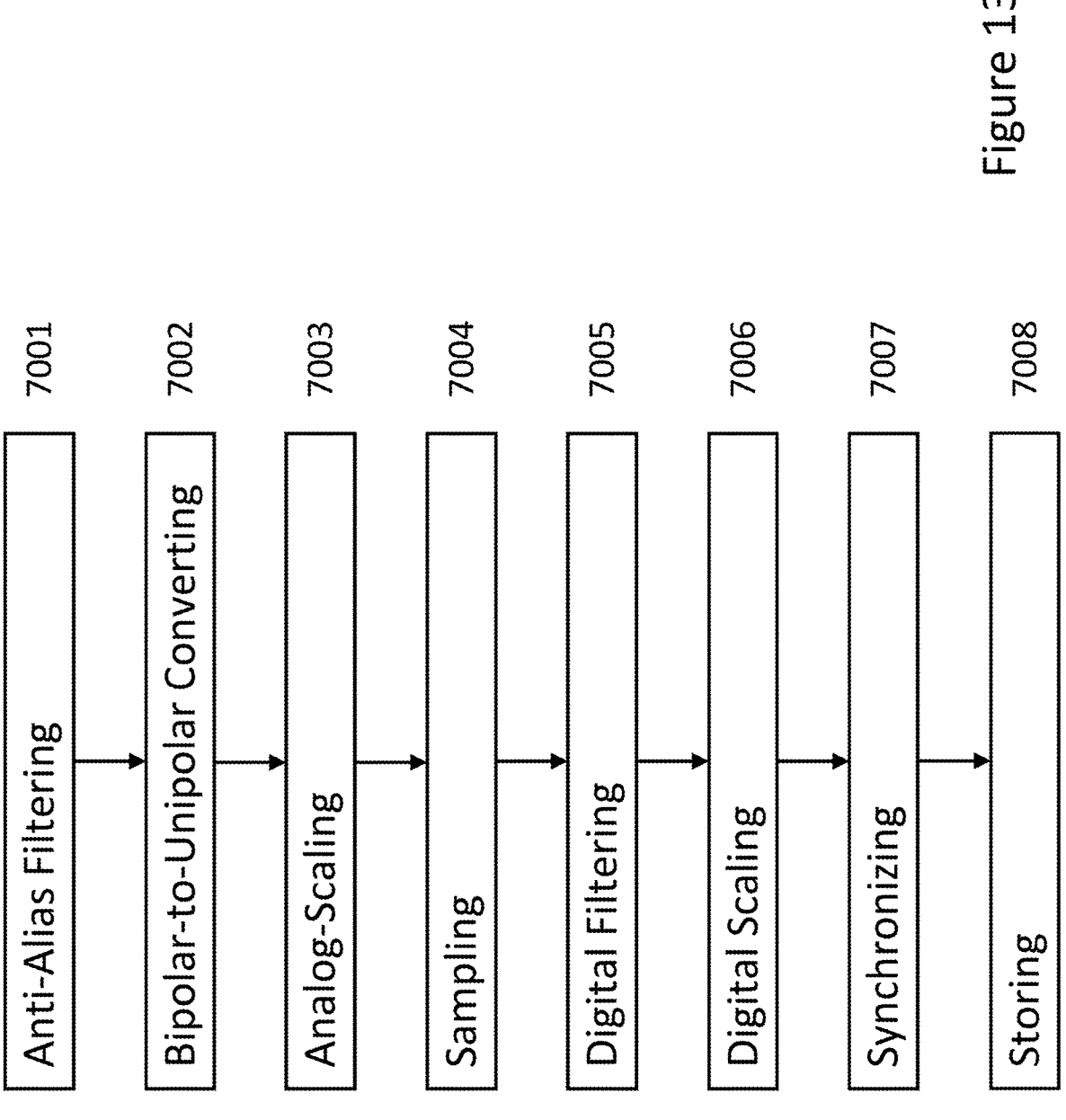
FIG. 13 is a flowchart illustrating steps for the operation of a DAQ system, in accordance with certain embodiments of the present disclosure.
Figure 14:
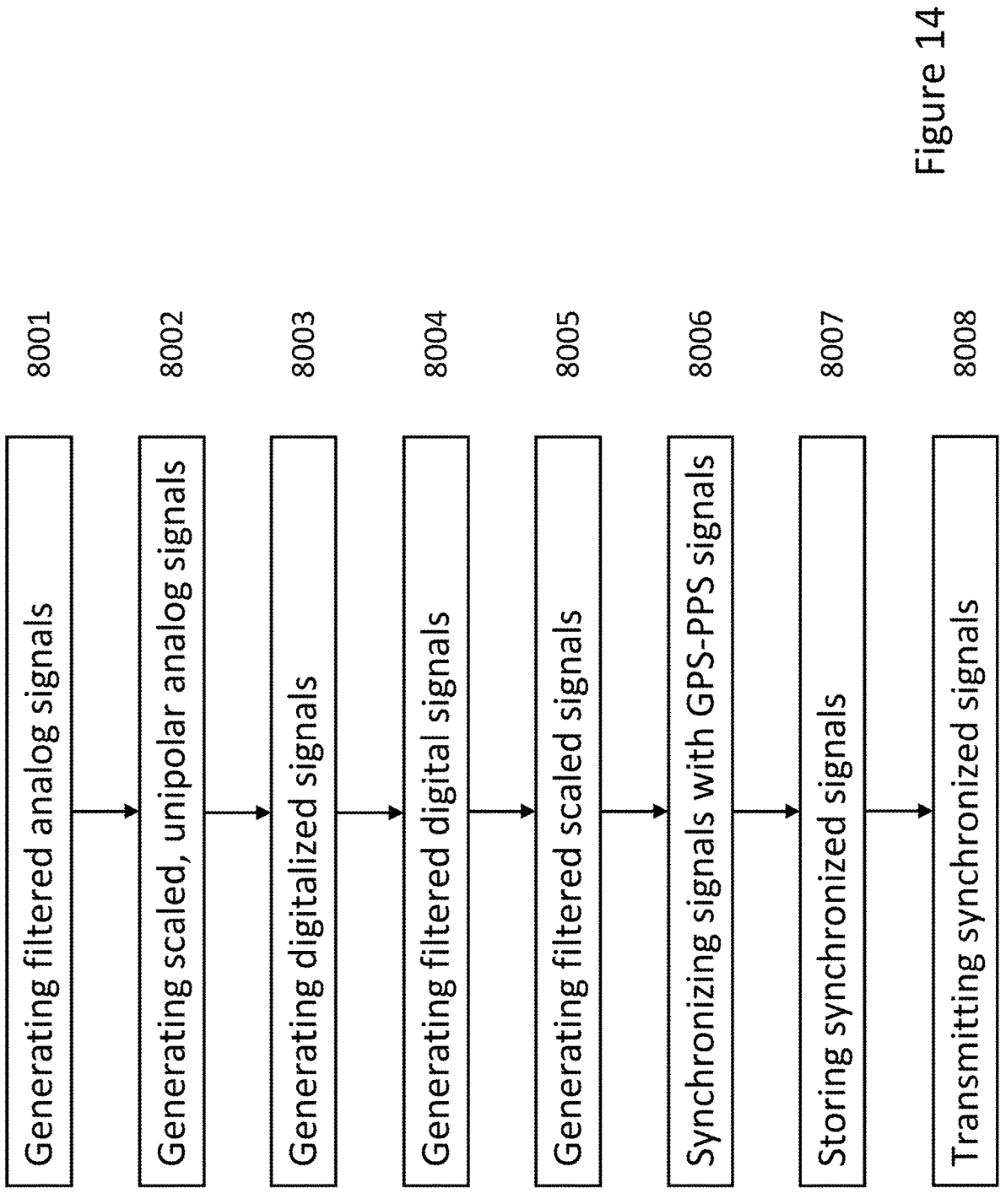
FIG. 14 is a flowchart illustrating exemplary steps of a method for using a DAQ system, in accordance with certain embodiments of the present disclosure.
Figure 15:
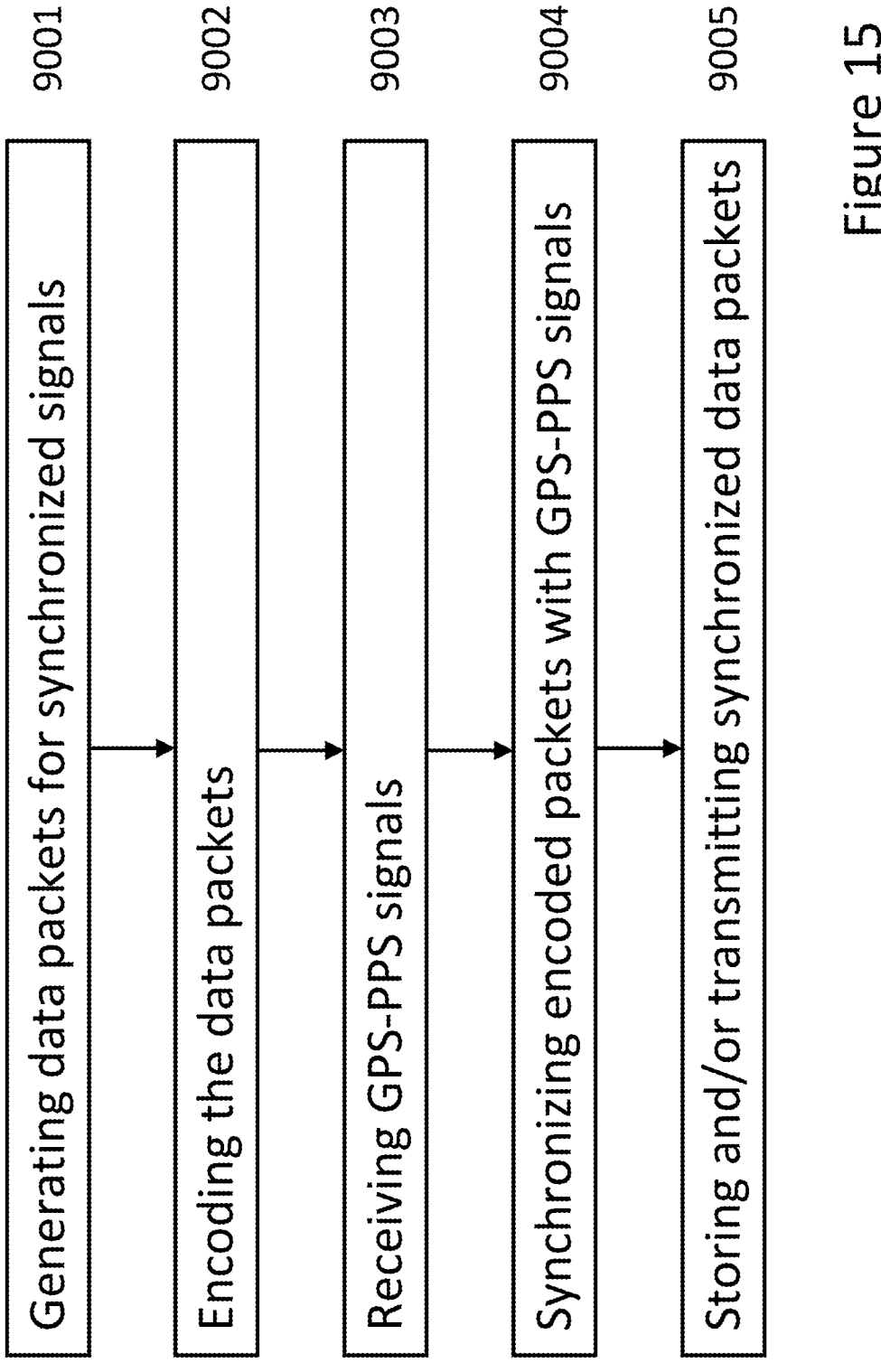
FIG. 15 is a flowchart illustrating exemplary steps for generating synchronized data packets and transmitting the packets from a DAQ system, in accordance with certain embodiments of the present disclosure.

In accordance with certain embodiments, the DAQ system 1 may be implemented by the methods disclosed herein, which may comprise the steps depicted in FIGS. 13-15. In some embodiments, the DAQ system 1 may be implemented by computer-readable medium having instructions configured to be executed by a processor or microcontroller 300 adapted to control operations of the DAQ system 1, such that the executed instructions are adapted to cause the processor/ microcontroller 300 to perform such steps. The computer-readable medium may be non-transitory. In some embodiments, the computer-readable medium may comprise removable memory medium 600 such as the SD card 313. The microcontroller or processor 300 may be adapted to receive instruction from the SD card or memory medium 313. Accordingly, the processor 300 may execute the instructions loaded on the computer-readable medium 313 to perform the disclosed steps and control operations of the DAQ system 1. In an embodiment, the storage circuitry 260 may comprise the computer-readable medium having the instructions for performing the steps of the disclosed methods.

As shown in FIG. 13, in accordance with certain embodiments, a DAQ method or process 7000 may comprise the steps of anti-alias filtering [block 7001], bipolar-to-unipolar converting [block 7002], analog-scaling [block 7003], sampling [block 7004], digital filtering [block 7005], digital scaling [block 7006], synchronizing [block 7007], and storing [block 7008]. In some embodiments, the anti-alias filtering step [block 7001] may comprise filtering analog signals 111 received from a sensor 800. The bipolar-to-unipolar converting step [block 7002] may comprise converting bipolar polarity signals 142 to unipolar polarity signals 113. The analog-scaling step [block 7003] may comprise scaling the filtered analog signals 112. The bipolar-to-unipolar converting step [block 7002] and the analog-scaling step [block 7003] may be performed simultaneously, such that any filtered analog signals 112 that comprise bipolar polarity signals 142 are converted to unipolar polarity signals 113. In an embodiment, the bipolar-to-unipolar converting step [block 7002] may be replaced with an analog-biasing step. The sampling step [block 7004] may comprise sampling or digitizing the scaled analog signals 114, which may comprise buffered signals 115 as the process 7000 may comprise a buffering step that buffers the scaled analog signals 114 for transmission to the ADC 200. Once the ADC 200 receives such preprocessed signals, the sampling step [block 7004] may comprise generating digitized signals 121 based on the preprocessed signals. The digital filtering step [block 7005] may comprise filtering the digitized signals 121. The digital scaling step [block 7006] may comprise scaling the filtered digital signals 122. The synchronizing step [block 7007] may comprise synchronizing the scaled digital signals 123 with PPS signals 501 received from the GPS receiver 500. The storing step [block 7008] may comprise storing the synchronized signals 244. The process 7000 may further comprise the step of transmitting the synchronized signals 244 from the microcontroller 300 to a remote system or device, which may comprise a host device 1000.

As shown in FIG. 14, a DAQ method or process 8000 in certain embodiments may comprise the steps of: generating the filtered analog signals 112 via the anti-alias filter circuitry 411 based on the analog signals 111 [block 8001]; generating the scaled analog signals 114 via the analog-scaling circuitry 413 [block 8002]; generating the digitized signals 121 via the sampling circuitry 210 [block 8003]; generating the filtered digital signals 122 via the digital-filter circuitry 220 [block 8004]; generating the scaled digital signals 123 via the digital-scaling circuitry 230 [block 8005]; synchronizing the PPS signals 501 and the scaled digital signals 123 via the synchronization circuitry 240 [block 8006] such that the synchronization circuitry 240 generates the synchronized signals 244; storing the synchronized signals 244 [block 8007]; and, transmitting the synchronized signals 244 [block 8008]. In some embodiments, the process 8000 may further comprise the steps of receiving analog signals 111 from a sensor 800 and converting a bipolar polarity dataset 142 of the analog signals 111 to an unipolar polarity dataset 113.

As shown in FIG. 15, a DAQ method or process 9000 in some embodiments may further comprise the steps of: generating the data packet 245 based on the synchronized signals 244 [block 9001], wherein the data packet 245 may be configured to be transmitted to the host device 1000; encoding the data packet 245 for transmission via a RS-485 power-over-bus channel such as a RS-485 bus cable 314 [block 9002]; receiving the PPS signals 501 from a GPS receiver 500 [block 9003]; and, synchronizing the encoded data packet 245 with GPS data 502 generated based on the PPS signals 501 received by the microcontroller 300 [block 9004]. In an embodiment, such steps may be performed by the transmission circuitry 250 embedded in the microcontroller 300. The process 9000 may further comprise the step of storing and/or transmitting the synchronized data packet 245 on the memory medium 600 via the storage circuitry 260 [block 9005].

One benefit of the present disclosure, in certain embodiments, may include the simultaneous sampling of four channels 400 of sensor data 130 at predetermined sampling rates, which may range 130' from 0 kHz to 32 KHz, that permit the efficient anti-alias filtering of analog signals 111 received from a sensor 800. In some embodiments, the predetermined sampling rate may be at least 32 kHz, such that the DAQ system 1 may be utilized with a sensor 800 to monitor acoustic signals 2 at 16 KHz frequencies as the bandwidth may be half of the sample rate based on Nyquist's theorem. In an embodiment, the rate for storing samplings of digitized data 121 may be 8 kHz to 16 kHz while the 256 kHz may be the configured rate to decimate the sensor data 130. The improved anti-alias filtering process permits a reduction in the number of components for, and consequentially the physical space for, the anti-alias filtering process necessary to digitize the detected data. The technical advantages of the present disclosure overcome the SWaP requirement deficiencies of conventional systems, which included modular systems that require more physical space or analog-to-digital (A/D) multiplexing that are prone to channel settling time issues and phase mismatching issues. Multiplexing may rely on a single ADC converter that reads every channel in sequence in order to perform the task of several ADCs in a multichannel system. Multiplexing systems and modular systems often required substantially larger anti-alias filters in order to ensure that the data could be sampled at a slow enough data rate to be managed by the processing circuitry, or used multiple ADCs that required multiplexing of the analog samples, or required digital filtering by the circuitry which limited the ability of the processor to perform other tasks.

Referring back to FIG. 2, the housing 10 of the DAQ system 1 may have an exterior surface adapted to connect to a sensor 800. Alternatively, as shown in FIG. 1, a tether 3 may connect the housing 10 of the DAQ system 1 to a sensor housing 810 of the sensor 800. The tether 3 may comprise an UART bus 311, a parallel bus cable 312, a RS-485 bus cable 314, a RS-232 bus cable, an USB cable 305, a TCP-IP bus, or an Ethernet bus adapted to transmit the analog signals 111 to the DAQ system 1 in accordance with the present disclosure. The housing 10 of the DAQ system 1 may be adapted to encase the DAQ system 1, and the sensor housing 810 may be adapted to encase the sensor 800. Such encasings may be adapted to seal out water intrusion at predetermined water depths. For example, the housings 10, 810 may be adapted to withstand at least 650 psi during their respective operation.

Figure 16:
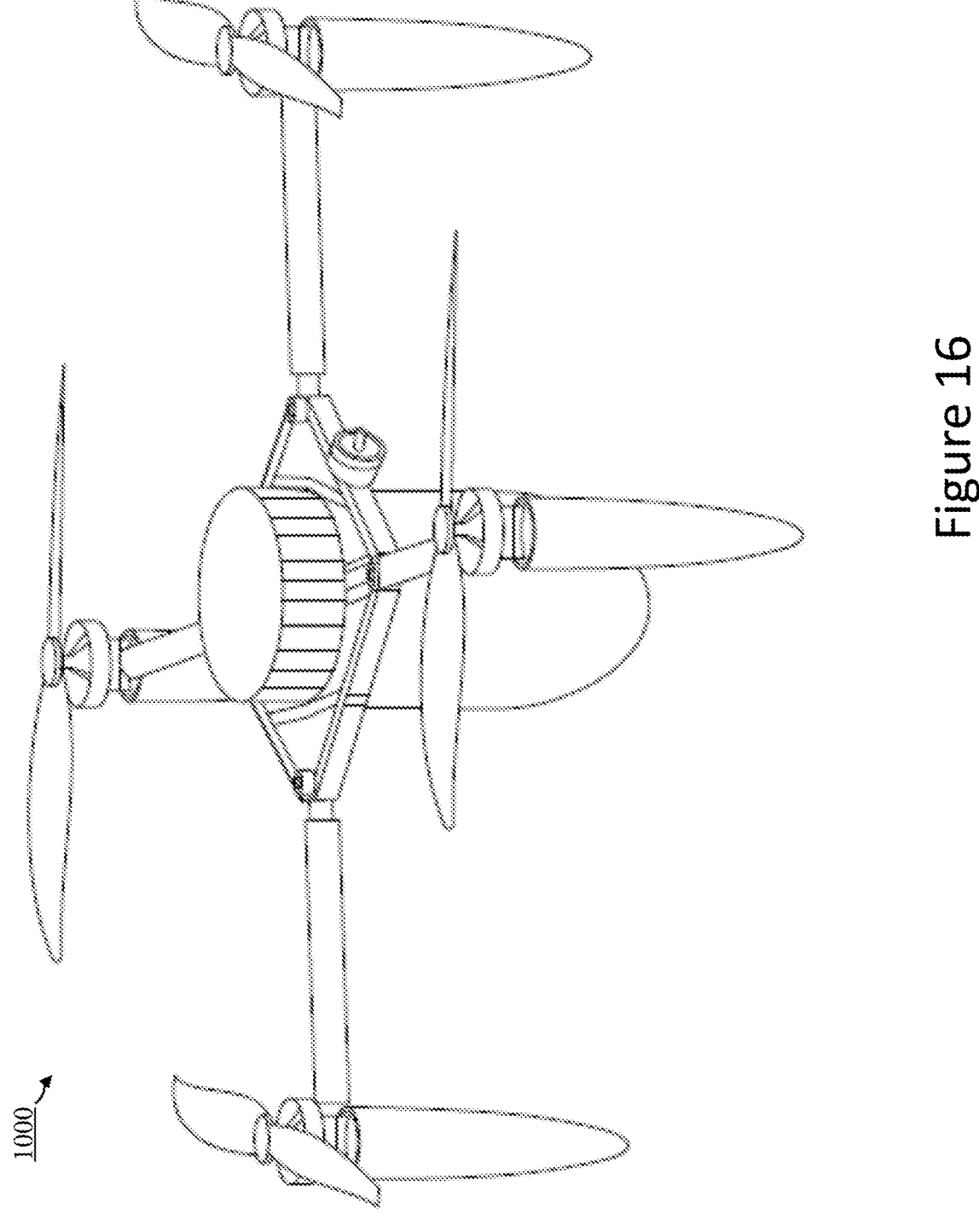
FIGS. 16-22 illustrate views of exemplary embodiments for a host device and its components, such as host power-and-communication boards, in accordance with certain embodiments of the present disclosure.

In some embodiments, as shown in FIG. 16, the host device 1000 may comprise unmanned autonomous vehicles 1000, such as hybrid mobile vehicles (HMVs) 1000, which may be adapted to receive the synchronized data packets 245 from the DAQ system 1 in real-time based on the receipt of the analog signals 111 by the DAQ system 1 from the sensor 800 as the analog signals 111 are generated based on the detection of the acoustic signals 2 detected by a sensor 800 as shown in FIG. 1. In addition to flying above the water surface 9, such HMVs 1000 may float or ride on the water surface 9.

Figure 17:
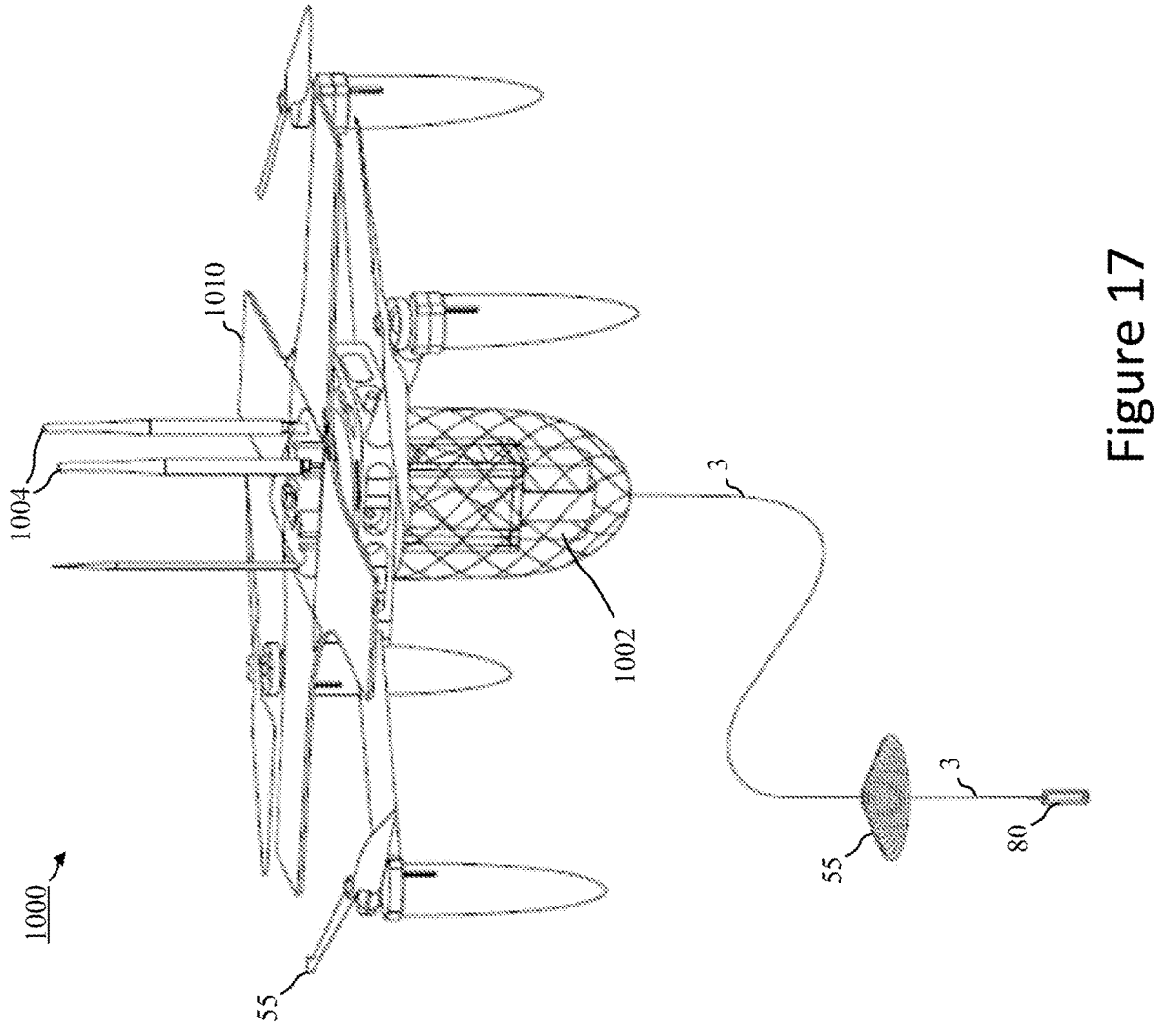
Figure 19:
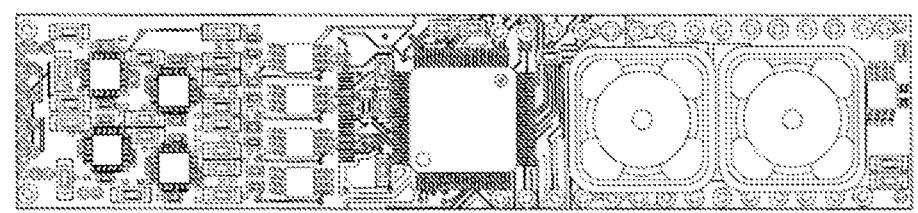

FIG. 17 shows exemplary components of the host device 1000, such as the host-power source 1002, propellers 1050, host antennas 1004, and the host solar-recharge system 1010 that may comprise a solar array of panels. A tether 3 may connect the host device 1000 to sensor system 80, which may comprise the DAQ system 1 and the sensor 800. The sensor system 80 may integrate the DAQ system 1 and the sensor 800 together, or the DAQ system 1 and the sensor 800 may be located within the sensor system 80 and communicate with one another as disclosed herein. The tether 3 may also connect to a motion damper 55, which may stabilize the DAQ system 1 within its surrounding environment or an operational/targeted area 8. The communication data 4 received by the host device 1000 from the DAQ system 1 of the sensor system 80 may comprise acoustic bearing information that may be utilized by the host device 1000 to make operational and navigation decisions.

Figure 18:
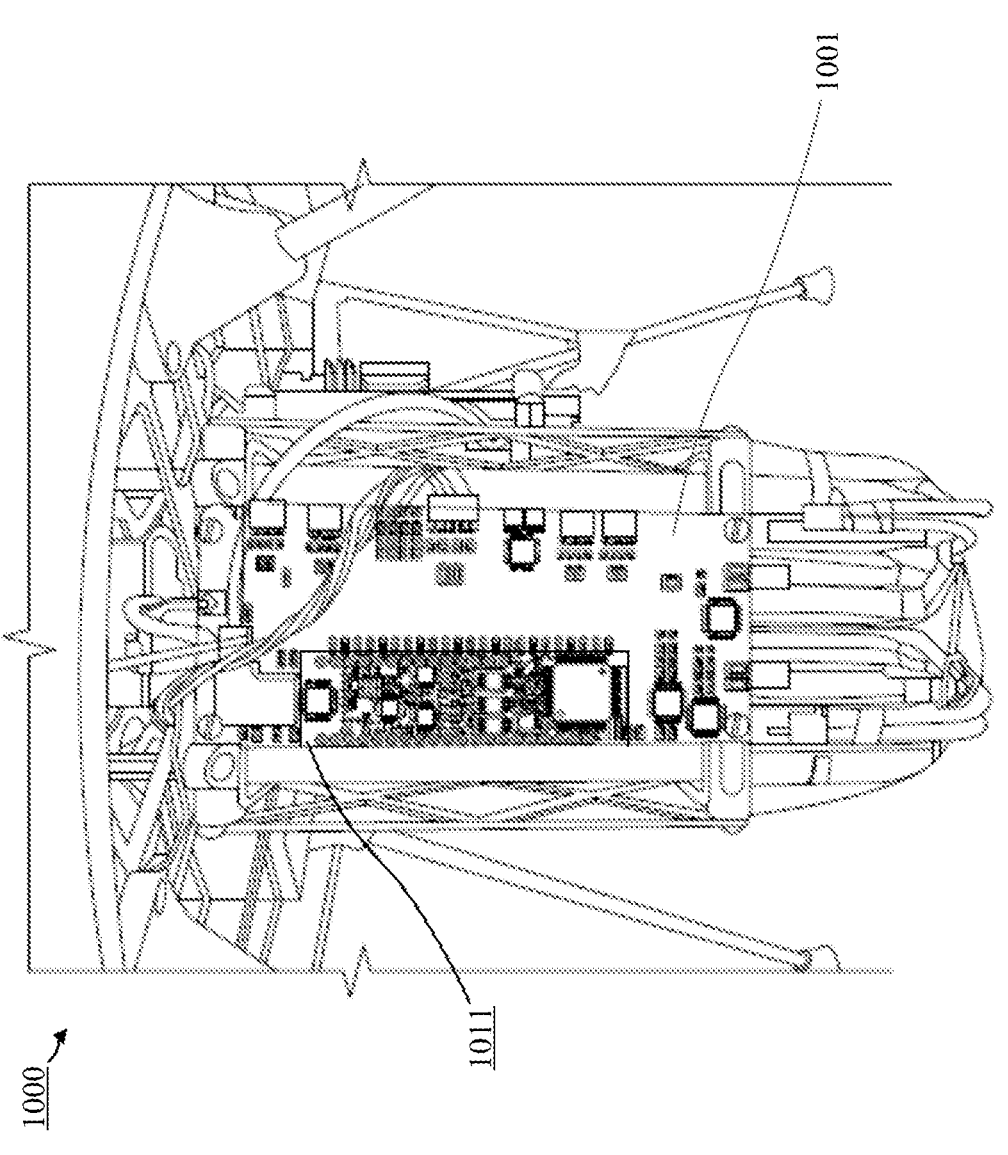
Figures 20, 21, 22:
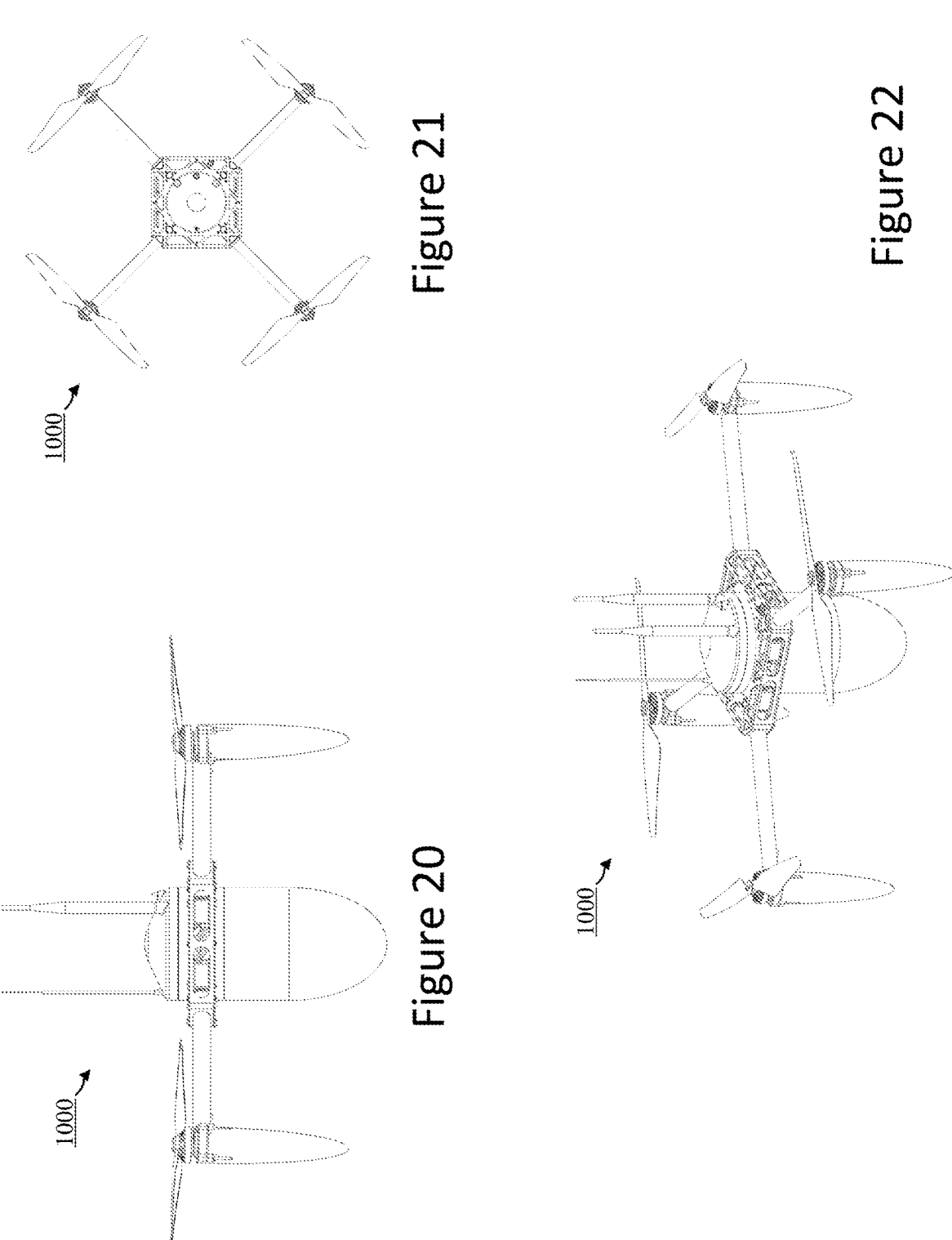

Accordingly, the data acquisition operations performed by the DAQ system 1 may be generated without burdening the computational resources of the vehicle 1000 required to manage general tasks such as navigation, cooperative behavior, data analytics, transmission of actionable data and other vehicle/mission tasks. The DAQ system 1 computations may include the sampling of four analog channels simultaneously with sufficient sampling frequency and buffer size to resolve a useful signal frequency range, as well as the execution of Fourier and coherence analysis between channels. In embodiments having such DAQ systems 1 carried or towed by HMVs 1000, bearing angles measurements may be generated by navigation circuitry of the host device 1000. In some embodiments, the communication data 4 received from the DAQ system 1 may be further transmitted by the HMV 1000 via satellite communications remote device 5 as shown in FIGS. 1 and 2. In accordance with certain embodiments, a host power-and-communication CCA board 1001 may be embedded within a host device 1000, as shown in FIG. 18, and integrated with a SBC 1011 having the form shown in FIG. 19. FIGS. 20-22 show a side-view, a top-view and a perspective view of a host device 1000, respectively.

The host device 1000 may comprise a transporter 1000 adapted to transport the sensor system 80. In certain embodiments of the present disclosure, the DAQ system 1 may comprise a sensor 800 adapted to locally pre-process and record data while submerged under the water surface 9 and to transmit the processed data via a tether 3 to a carrier or transporter 1000, such as a buoy 1000' or a vehicle 1000 or a hybrid multi-rotor drone 1000 adapted to float or ride on the water surface 9 and fly through the air above the water surface 9, that may be adapted to further process or condition the signals 111 and data 130 received from the sensor 800, and to power the vector sensor 800, and/or to communicate with a remote system/device 5 via host antennae 1004 that may transmit and/or receive communication signals 4 such as satellite or radio frequency (RF) signals 4. In certain embodiments, the remote system/device 5 may be located on a ship or on land at a research laboratory or military base.

In some embodiments, the transporter 1000 may comprise an underwater unmanned vehicle (UUV), unmanned aerial vehicle (UAV), unmanned surface vehicle (USV), unmanned autonomous vehicle, drone airplane, hybrid mobile vehicle/buoy, aqua-quad, multi-rotor mobile buoy, floating buoy, submerged buoy, sonobuoy, wave glider, or sea glider. In addition to such transporters 1000 adapted for the transportation or movement of sensors 800 through a medium such as water or air, in an embodiment, a transporter/carrier 1000 may comprise a stationary system or device 1000 adapted to secure, carry and/or maintain a sensor 800 at a predetermined location. Such a stationary carrier/system 1000 may comprise a bottom mounted system 1000, which may be adapted for deployment on an underwater surface 7 at a location that may be predetermined. The underwater surface 7 may comprise an underwater floor, such as an ocean floor, sea floor, and riverbed. A bottom mounted system 1000 may include DeepWater Buoyancy Inc.'s instrument bottom mounts. In an embodiment, a mobile transporter 1000 may be adapted to deploy a stationary transporter/carrier 1000 having a DAQ system 1. In certain embodiments, the transporter 1000 may be adapted for moving a sensor 800 within a targeted zone 8. The sensor 800 may comprise a sensor system 800 having an integrated a DAQ system 1. In some embodiments, the transporter 1000 may comprise an autonomous vehicle 1000 programmed with computer code instructions to traverse a medium within a targeted zone 8.

In an embodiment, referring back to FIG. 1, the sensor system 80 may comprise a kit 80' having a sensor housing 810 that encases the sensor 800. The kit 80' may also comprise the tether 3 adapted to connect the sensor housing 810 and the housing 10 of the data acquisition system 1. The sensor system 80 may be adapted to maintain a neutral buoyancy in water. In certain embodiments, the sensor housing 810 and the housing 10 may each comprise a capsule housing 10' and 810' that lack any thrusters, propellers and propulsion systems and may be adapted to float and/or be towed via a tether 3. In an embodiment, the housing 810 of the sensor system 80 may be adapted to withstand water pressure from being submerged under the water in depths of at least 1500 feet. The housing 810 may be adapted to withstand at least 650 psi during operation of the data acquisition system 1. The housing 810 may comprise a pressure vessel encasing the DAQ system 1 adapted for implementations at predetermined depths and pressures.

A sensor 800 tethered to certain vehicles 1000 may be adapted to sense acoustic signals 2 on or above the water surface 9 during air flight. A plurality of vehicles 1000 may be deployed and adapted to be controlled by cooperative and swarm behaviors for coordinated distributed array sensing for a broad spectrum of missions. In an embodiment, a sensor-tethered host device 1000 may comprise buoy 1000' carrying/totting a sonobuoy sensor 800' with a DAQ system 1 via a tether 3 as shown in FIG. 2. The sensor-tethered buoy 1000' may comprise a sonobuoy 1000' adapted to combine a sonar and buoy, which may be launched/dropped/ejected from land, aircrafts, helicopters or ships to conduct, among other missions, underwater acoustic research within a sonobuoy field 8'. In some embodiments, the targeted zone 8 for deployment of sensor-tethered vehicles 1000 may comprise a sonobuoy field 8' where at least one sonobuoy 1000' is deployed. Such a sonobuoy 1000' may detect and identify targeted objects 6 moving under the water surface 9. In an embodiment, a detected object 6 may comprise an underwater object 6 of interest such as predetermined animals 6 and/or predetermined vehicles 6 that the DAQ system 1 may be adapted to identify under the water surface 9.

In accordance with some embodiments, the plurality of vehicles 1000 may be deployed with a certain sensor 800 or varying types of sensors 800. One or more sensor 800 may comprise a vector sensor, microphone, pressure sensor, accelerometer, hydrophone, temperature sensor, inertial measurement unit (IMU), or gyroscope. The DAQ system 1 may record continuous data 130 and digital signals 701 received from digital sensors 800. In an embodiment, the DAQ system 1 may measure and record structure-borne noise. In some embodiments, the DAQ system 1 may measure and record pressure, acceleration or noise in airplanes, trains, buses, vans, or cars. In some embodiments, the DAQ system 1 may record gyroscope data, vibration data, dynamic pressure measurements for shipboard shock and other shock events, and/or acceleration for handling issues during shipping.

In some embodiments, a benefit of the present disclosure may include a sensor-tethered vehicle 1000 adapted to autonomously land and launch from the surface 9 of the water. In certain embodiments, the frame of a vehicle 1000 may be constructed from carbon fiber in order to provide an improved strength-to-weight ratio. The main body and outriggers for the vehicles 1000 may be 3D printed or additively manufactured for the quick adaptation to various environments, missions and tasks.

As described herein, the presently disclosed DAQ system 1 may convert analog signals 111 received from a sensor 800 into digitized signals 121. Such an analog-to-digital (A/D) conversion, often referred to as ADC, based on acoustic signals 2 may include the recording of sensor data 130 in a digitized format, in accordance with certain embodiments. Acoustic signals 2 may refer to sound or pressure waves heard over a medium such as air or water while audio or analog signals 111 may refer to an electrical representation or transmission of such acoustic signals/waves 2. In an embodiment, an ADC component 200 converts a continuous-time and continuous-amplitude analog signal 111 to a discrete-time and discrete-amplitude digitized signal 121. The ADC component 200 may comprise a computer-controlled voltmeter adapted to receive an analog signal 111 as input and generates a computer-readable binary number as a digitized output 121. Prior to the analog-to-digital conversion, the analog signals 111 may be pre-processed to generate an input signal that may be utilized by the ADC component 200. Such preprocessing may comprise the steps of scaling, anti-alias filtering and bipolar-to-unipolar converting the analog signals 111 in accordance with certain embodiments, as described herein. An analog anti-aliasing filtering process may remove or ignore analog signals 111 associated with frequency values 111' higher than a predetermined frequency value 111'. A scaling process may remove or ignore analog signals 111 associated with frequency values 111' outside a frequency range 111" set by a predetermined lower frequency value 111' and a predetermined upper frequency value 111'. A bipolar-to-unipolar converting process may generate input signals that only include positive voltage values (unipolar values, e.g. 0-10 V) based on analog signals that include both negative and positive voltage values (bipolar values, e.g. ±5 V).

In some embodiments, processing of the analog signals 111 may be conducted by the DAQ system 1 in order to determine bearing estimations. The presently disclosed DAQ systems 1 may be implemented underwater at, or near, the sensor 800 in order to provide an improved processing of acoustic signals 2 detected underwater. In some embodiments, the processed data may be transmitted from the presently disclosed underwater DAQ system 1 of the sensor 800 via a tether 3 connected to a buoy/vehicle 1000. The pre-processed data received by the sensor-tethered buoy/vehicle 1000 may be further processed and/or transmitted by the buoy/vehicle 1000 to remote devices/systems 5. In certain embodiments, such transmission by the buoy/vehicle 1000 may be implemented over satellite or radio frequencies signals 4. The remote system/device 5 may further analyze the received data.

In certain embodiments, A/D conversion code may be implemented by the DAQ system 1 that may be mounted on, or in proximity to, the vector sensor 800 to perform the signal processing and determination of bearing angles that may identify the location of a targeted object 6. In an embodiment, the DAQ system 1 may be embedded on or within the vector sensor 800 to form a single, integrated unit. The DAQ system 1 may transmit such processed data via a tether 3 from the submerged DAQ system 1 embedded on the vector sensor 800 to topside electronics, which may be implemented on a hybrid mobile buoy/vehicle 1000 located on or above the water surface 9. The sensor-tethered buoy/vehicle 1000 may further transmit the received bearing angles that are tracked using the submerged vector sensor 800. In some embodiments, the DAQ system 1 may transmit acoustic data samples to the surface 9 in order to make the system compatible with Carrier-Based Tactical Support Centers (CVTSC) or stations. In an embodiment, the sensor-tethered HMV 1000 may also transmit acoustic samples transferred by the underwater DAQ system 1 while the acoustic samples are received by the DAQ system 1 in real-time from the vector sensor 800. Accordingly, the HMV 1000 may transmit such acoustic samples to the CVTSC surface system with minimal dropped data. In an embodiment, the transmitted data may be based on adjustments to the data packet, transmission encoding scheme, and sample rate as determined by the DAQ system 1.

In an embodiment, the disclosed DAQ system 1 may be located at or near the vector sensor 800, and may be adapted to engage the vector sensor 800. The disclosed DAQ system 1 may be electrically connected to the vector sensor 800 via one or more electrical wires, cables and/or data buses. One or more of the data buses may comprise a collection of wires that transport digital information, and may also conduct electrical power. The DAQ system 1 may power the vector sensor 800, e.g. with eight volts. The vector sensor 800 may be adapted to transmit analog data to the DAQ system 1, which may be adapted to receive the transmitted analog data from the vector sensor 800. The analog data may comprise acoustic data samples received from the vector sensor 800. The data exchange between the vector sensor 800 and the DAQ system 1 may comprise serial communications based on the recommended standard (RS) 485 that may enable a linear bus topology using two wires and that may define the electrical characteristics of the generator (transmitter or driver), receiver, transceiver used in the DAQ system 1. In certain embodiments, the RS-485 data exchange may provide for network-attached storage (NAS) of the processed data on the DAQ system 1. In some embodiments, the data storage component of the DAQ system 1 may comprise a memory medium or block 600 within the CCA board 100 such as a storage chip for a Teensy® board 100 which may comprise Electrically Erasable Programmable Read Only Memory (EEPROM) that may store data without power, and that may be erased and reprogrammed using a pulsed voltage.

In certain embodiments, the disclosed DAQ system 1 may comprise a microcontroller 300 on a CCA board 100 adapted to store analog data 111 received from the vector sensor 800. The microcontroller 300 of the DAQ system 1 may be further adapted to pre-process the analog/sensor data, and also transmit the processed data up via a tether 3 to the HMV 1000 at the water surface 9. In some embodiments, the tether 3 may comprise a RS-485 bus 314 adapted to transmit power 903 and data 4. Such power-over-bus wiring in the tether 3 may be an alternative option to a plurality of wiring/cables where some wires are adapted to power the DAQ system 1 while other wires are adapted to transmit data between the vector sensor 800 and the DAQ system 1, in accordance with some embodiments. The transfer speeds for data transmitted from a microcontroller 300 for a Teensy® board 100 of the DAQ system 1 may be based on standard Universal Asynchronous Receiver Transmitter (UART) rates. In some embodiments, the microcontroller 300 may be adapted to support a Secure Digital (SD) card 313, Universal Serial Bus (USB) 315, a RS-485 bus 314 and/or Ethernet in order to achieve faster transfer speeds.

The data transmitted from the DAQ system 1 may comprise analog data 111, such as acoustic data samples received from the vector sensor 800, and/or digitized data 121 generated by the 24-bit analog to digital (A/D) conversion of such signals received from the vector sensor 800. The data received by the DAQ system 1 may comprise Global Positioning System (GPS) data 502, which may include Pulse Per Second (PPS) data 501'. Such PPS data/signals 501 may be received from a host 1000, such as a buoy/vehicle 1000. The DAQ system 1, along with the vector sensor 800, may be tethered to the host vehicle/buoy 1000. The GPS data 502 may be generated by a GPS receiver 500 located on the host vehicle/buoy 1000, and the DAQ system 1 may be adapted to receive such GPS data 502. Such data 502 may reflect the geographic position of the host vehicle/buoy 1000. In some embodiments, the GPS data may be associated with the acoustic data samples received from the vector sensor 800. In some embodiments, the recordation of the GPS data 502 and the scaled digital signals 123 may be synchronized. In an embodiment, the associated sets of GPS data 502 and scaled digital signals 123 may be stored together along with corresponding time stamps.

In certain embodiments, such GPS data 502 may comprise National Marine Electronics Association (NMEA) formatted data that complies with the standard used by marine instrumentation for vessels. The NMEA-formatted data 502 received from the GPS receiver 500 may be graphically displayed on a monitor. In some embodiments, the GPS NMEA data 502 may be adapted to reflect the geographic position of the host vehicle/buoy 1000 on a map corresponding to the geographic area at points in time when the acoustic data samples reflect the detection/identification of a targeted object 6. In an embodiment, the GPS NMEA data 502 may enable the DAQ system 1 to track the position of the vector sensor 800 and to further generate waypoints based on the determined position of the targeted or tracked object 6. The host vehicle/buoy 1000 may further comprise a power and communication board 1001, which may comprise a Teensy® CCA board 1001, in accordance with some embodiments.

Upon transmission up the tether 3, the synchronized data packet 245 may be received by a host 1000. The host 1000 may be located at, near or above the water surface 9. The host 1000 may be adapted to receive host-source power 1012, such as raw battery voltage. The Teensy microcontroller 12 may be adapted to parse the received data and saving it in memory on the host 1000. In an embodiment, a DC offset circuit may be utilized at the end of a differential op-amp filter to convert the signal from bipolar to monopole. When transmitting synchronized data packet 245 up the tether 3 from the vector sensor 800 via the DAQ system 1 to the host 1000 at the water surface 9, the data packet 245 may be Manchester-encoded to bypass the DC filter circuit as well as down-sampled to accommodate the transmission capabilities of the Teensy® CCA board 100 of the DAQ system 1. In certain embodiments, when the hardware filter provided on the CCA board 100 is determined not to satisfy the lower sample rate requirement demanded by the CCA board 100, the signal may be oversampled to adhere to the hardware filter and subsequently down-sampled. Accordingly, the host 1000 may transmit all acoustic channels at a sample rate that enables the tracking of targeted objects 6 such as underwater vehicles 6 of interest.

The processed data may be transmitted via radio waves 4 from the host 1000, in accordance with certain embodiments. In an embodiment, the host vehicle/buoy 1000 may transmit the processed data at the sample rate that the DAQ system 1 receives the pre-processed data from the vector sensor 800. The host vehicle/buoy 1000 may comprise host antennae 1004 adapted to radiate and/or receive radio waves 4, in accordance with certain embodiments.

In accordance with certain embodiments of the disclosure, a method for the operation of a DAQ system 1 may include the step of data acquisition from analog signals 111 provided by sensors 800 operating in the 0-16 kHz region. The method may further include the step of powering the sensors 800. In some embodiments, the method may include the time synchronization of the data acquisition between the sensors 800 carried by a host device 1000 and other devices lacking a connection to the sensors 800, which may comprise other host devices 1000 that carry other sensors 800. In an embodiment, the DAQ communication devices 104 for a swarm 1100 of DAQ systems 1 may be adapted to communicate with each other. The DAQ communication devices 104 may comprise an optical communication system 104' adapted to transmit light signals 105 which may be timed to enable time synchronization of the data acquisition amongst the DAQ systems 1. The light signals 105 may comprise PPS signals 501 and navigation instructions 105' transmitted between a transporter 1000 and a DAQ system 1 that the transporter 1000 carries. The navigation instructions 105' may be based on the synchronized signals 244 that identify a location of a detected object 6 at a point in time. Based on the navigation instructions 105', the transporter 1000 may be commanded to navigate towards the location of the detected object 6. The method may be performed by the disclosed DAQ system 1 that may comprise an ultra-small, low-power system 1 using one or more of the disclosed circuits and interfaces. In certain embodiments, several sensor-specific signal processing and communication algorithms may be implemented by the disclosed systems and methods.

The disclosed DAQ system 1 may enable the powering of sensors 800, the synchronization of multiple sensors 800 via the PPS signals 501, the 24-bit analog to digital (A/D) conversion of analog signals 111 received from the sensors 800, and/or the storage or transmission of data 4 based on such signals 111. In some embodiments, the data acquisition system 1 may enable sensor calculations that reduce the data storage and transmission requirements. DC power may be supplied as host-source power 1012 via the host platform directly to the data acquisition system 1 or over a RS-485 bus 314. Such power 1012 may be conditioned by the data acquisition system 1, and provided to the attached sensors 800. In certain embodiments, GPS data 502 that may include PPS data 501' data or accompanied by PPS signals 501 may be connected to provide precision synchronization. The data acquisition system 1 may synchronize the clock-time of the ADC 200 to the GPS data 502 or the PPS signals 501. In some embodiments, the disclosed system 1 may synchronize a sampling to allow for concurrent processing among multiple data acquisition systems 1. Communication with a data acquisition system 1 may be accomplished over multiple standard protocols. In an embodiment, a power over RS-485 bus 314 may be supplied for data acquisition systems 1 requiring limited wiring. Data 4 may be stored by the DAQ system 1 and/or streamed to a host system 1000 in real-time. At a predetermined data rate, more than a week of data 4 may be stored on the disclosed system 1.

An embodiment of the present disclosure may be implemented via firmware for a data acquisition system 1 and host device 1000. The steps of the disclosed methods may be completed cyclically by the disclosed systems 1 and devices 1000, in accordance with certain embodiments. The steps may be based on requirements for acoustic processing with localization standards. The disclosed systems or methods may include an optimization step that may adapt the disclosure to function on low-power computing systems. This may provide an advantage in cost, power efficiency, and size over generic systems that are commercially available.

Conventional systems typically require significantly more power, comprise a larger form factor, cannot be synchronized via GPS, and do not include software and hardware to control the acquisition of date from a plurality of the vector sensors. According to one technical advantage, the disclosed systems, devices and methods for acquisition of data from vector sensors may include low-power requirements that may be fulfilled by the disclosed power circuitry. In certain embodiments, the device or system may include a small form factor comprising miniature components that may be fulfilled by the disclosed circuitry.

The presently disclosed systems, devices and methods may provide any one of the following power-feature benefits: extremely low-power usage (<2.4 Watts); the ability to provide sensor power (8V, 200 mA); a data acquisition system powered by 9-26V using separate wires or using a power over RS-485 bus architecture; custom 5b6b encode and decode functions implemented to support power over RS-485 bus architecture; and/or a hibernation mode to allow data acquisition over extended periods when running on battery packs. Data acquisition benefits may include: 24 bit A/D conversion; custom firmware for interacting with AD7768 ADC; analog and digital data synchronized acquisition; external GPS synchronization for multiple units; low noise A/D with high dynamic range; data storage; real-time connection via USB, Ethernet, RS-485, RS-485 over power or other communication protocols; an onboard, programmable microprocessor; low data transfer error rate; and/or, a combination of unique message structure, error checking and encoding for line balancing. A technical advantage relating to size of embodiments for the disclosure may include an ultra-small form factor compared to conventional ADCs.

Another advantage of the present disclosure relates to the varying applications and implementations in accordance with certain embodiments, including: undersea; vector sensors; hydrophone or microphone arrays; standalone DAQ recorder or attached to host for real-time processing and display; wearable device for gunshot (or other sound) localization; tethered load on a quadcopter; a mobile sonobuoy; and/or an UUV. Benefits of the present disclosure for vector sensor capabilities may include: polling of Non-Acoustic Sensors (NAS) via custom firmware; removed terminating resistor; added bulk capacitor; and reduced NAS sample rate for low noise digital sampling; configuration file for custom behavior without recompiling binaries; coordinate transformation from local sensor coordinate frame to global coordinate system, such as but not limited to North-East-Down (NED); and/or calibration matrix for NAS and acoustic sensors.

In an embodiment, the disclosure may include an initial filter design for anti-alias filter and power over RS-485 bus implementation. A/D conversion code may be implemented to perform processing of bearing angles and pass data up a tether to topside electronics for a hybrid mobile buoy. The conversion code may comprise Teensy® code for an USB-based microcontroller development system. In some embodiments, the disclosure may be implemented via a floating quad copter that could perform the functions of a sonobuoy. The disclosed system may comprise a low-power and high sampling rate data acquisition system. The disclosed method may be implemented by Teensy® code that may include the step of processing of concurrent tasks in real time. The code may determine the CPU load when running multiple concurrent tasks. In an embodiment, the processing of bearing angles may be performed via the Teensy® code. Anti-alias filtering, sample rates, A/D conversion code, and/or data encoding may be predetermined or selected in real time. The disclosure may implement signal processing techniques including filters, modulation and data transfer. Power may be implemented over RS-485 bus.

In accordance with certain embodiments, the circuitry for the disclosed system may include any combination of hardware, software, firmware, APIs, and/or other circuitry. The system circuitry may be implemented, for example, with one or more circuit card assembly (CCA) board, systems on a chip (SoC) board, servers, application specific integrated circuits (ASIC), field programmable gate arrays (FPGA), microprocessors, discrete analog and digital circuits, and other circuitry. The system circuitry may implement any desired functionality of the disclosed system. As just one example, the system circuitry may include one or more instruction processor and memory. The processor may be one or more devices operable to execute logic. The logic may include computer executable instructions or computer code embodied in the memory or in other memory that when executed by the processor, cause the processor to perform the features implemented by the logic. The computer code may include instructions executable with the processor. Logic, such as programs or circuitry, may be combined or split among multiple programs, distributed across several memories and processors, and may be implemented in a library, such as a shared library (e.g., a dynamic link library or DLL).

The memory stores, for example, control instructions for executing the features of the disclosed system. Examples of the memory may include non-volatile and/or volatile memory, such as a random access memory (RAM), a read-only memory (ROM), an erasable programmable read-only memory (EPROM), or flash memory. Alternatively, or in addition, the memory may include an optical, magnetic (hard-drive) or any other form of data storage device. In one implementation, the processor executes the control instructions to carry out any desired functionality for the disclosed system, including without limitation those attributed to data/reflection receiver (e.g., relating to the data receiver circuitry), image generation, and/or profiler results generation. The control parameters may provide and specify configuration and operating options for the control instructions, and other functionality of the computer device.

The computer device may further include various data sources, as described herein. Each of the databases that are included in the data sources may be accessed by the system to obtain data for consideration during any one or more of the processes described herein. For example, the data receiver circuitry may access the data sources to obtain the information for generating the images and the reflection returns. In an embodiment, a data receiver circuitry may be configured to receive reflected signals.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

In some embodiments, the computer device may include communication interfaces, system circuitry, input/output (I/O) interface circuitry, and display circuitry. The communication interfaces may include wireless transmitters and receivers (herein, "transceivers") and any antennas used by the transmit-and-receive circuitry of the transceivers. The transceivers and antennas may support Wi-Fi network communications, for instance, under any version of IEEE 802.11, e.g., 802.11n or 802.11ac, or other wireless protocols such as Bluetooth, Wi-Fi, WLAN, cellular (4G, LTE/A). The communication interfaces may also include serial interfaces, such as universal serial bus (USB), serial ATA, IEEE 1394, lighting port, I²C, slimBus, or other serial interfaces. The communication interfaces may also include wireline transceivers to support wired communication protocols. The wireline transceivers may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

While the present disclosure has been particularly shown and described with reference to certain embodiments thereof, it will be understood by those skilled in the art that various changes in form and details may be made therein without departing from the spirit and scope of the present disclosure. The term "adapted" when used in this disclosure shall mean programmed, configured, dimensioned, sized, connected, attached, positioned, oriented and arranged as appropriate to the purpose or function described. Although the terms "a" and "an" are used to reference the foregoing components, such terms are intended to encompass embodiments comprising one or a plurality of each of the disclosed components. The meanings and definitions of the terms used herein shall be apparent to those of ordinary skill in the art based upon the present disclosure.

Although some of the drawings illustrate a number of operations/steps in a particular order, operations which are not order-dependent may be reordered and other operations may be combined or broken out. While some reordering or other groupings are specifically mentioned, others will be apparent to those of ordinary skill in the art and so do not present an exhaustive list of alternatives. Moreover, it should be recognized that the operations could be implemented in hardware, firmware, software or any combination thereof. Any disclosed instructions, commands and/or code are examples, which may vary as understood by those skilled in the art, that are listed in order to illustrate the nature of certain embodiments.

What is claimed is:

1. A data acquisition system, comprising:

an analog anti-alias filter circuitry configured to filter analog signals and generate filtered analog signals based on the analog signals, wherein the analog anti-alias filter circuitry comprises a plurality of analog anti-alias filter circuits;

an analog-scaling circuitry configured to generate scaled analog signals based on the filtered analog signals, wherein the analog-scaling circuitry comprises a plurality of analog-scaling circuits;

a sampling circuitry configured to generate digitized signals based on the scaled analog signals, wherein the digitized signals comprise a digital sampling of the scaled analog signals;

a digital-filter circuitry configured to filter the digitized signals and generate filtered digital signals based on the digitized signals;

a digital-scaling circuitry configured to generate scaled digital signals based on the filtered digital signals;

a synchronization circuitry configured to synchronize Pulse Per Second (PPS) signals and the scaled digital signals and the scaled analog signals, wherein the scaled digital signals are synchronized with the scaled analog signals, and wherein the PPS signals are synchronized with both the scaled analog signals and the scaled digital signals, whereby the synchronization circuitry generates synchronized signals;

a circuit card assembly comprising an analog-to-digital converter (ADC); and, a microcontroller connected to a GPS receiver and a removable memory medium, wherein the microcontroller receives GPS data and the PPS signals from the GPS receiver, wherein the microcontroller generates a data packet based on the synchronized signals, wherein the data packet is configured to be transmitted to a host device, wherein microcontroller encodes the data packet for transmission via a RS-485 bus, wherein microcontroller synchronizes the encoded data packet and the GPS data and the PPS signals, wherein the microcontroller stores the synchronized data packet on the removable memory medium.

2. A data acquisition system of claim 1, wherein the microcontroller is connected to a sensor transceiver, wherein the sensor transceiver is configured to be connected to a sensor, wherein the sensor transceiver is further configured to digitally communicate with the sensor, wherein the sensor transceiver is further configured to receive digital data from the sensor and configured to transmit the digital data to the microcontroller, wherein the circuit card assembly further comprises four data channels, wherein ADC comprises a four-channel analog-to-digital converter, wherein the ADC is connected to a crystal oscillator and the microcontroller, wherein the ADC is adapted to connect to the GPS receiver and receive the PPS signals from the GPS receiver, wherein the ADC comprises the sampling circuitry and the digital-filter circuitry and the digital-scaling circuitry and the synchronization circuitry, wherein each one of the four data channels comprises one of the plurality of the analog anti-alias filter circuits and one of the plurality of the analog-scaling circuits and one of four buffering circuits, wherein the four data channels are adapted to simultaneously generate and transmit buffered signals, wherein the buffered signals are based on sensor data comprising hydrophone data and x-axis data and y-axis data and z-axis data, wherein the four data channels comprise a first, second, third and fourth sensor-data channel, wherein the first sensor-data channel is adapted to filter and adjust the hydrophone data, wherein the second sensor-data channel is adapted to filter and adjust the x-axis data, wherein the third sensor-data channel is adapted to filter and adjust the y-axis data, wherein the fourth sensor-data channel is adapted to filter and adjust the z-axis data, wherein the ADC is adapted to receive the buffered signals from the four data channels, wherein the ADC is further adapted to transmit the synchronized signals to the microcontroller, wherein the microcontroller is adapted to synchronize the encoded data packet with the digital data.

3. The data acquisition system of claim 1, further comprising:

a signal-receiving circuitry configured to receive the analog signals, wherein the signal-receiving circuitry is connected to the analog anti-alias filter circuitry.

4. The data acquisition system of claim 3, wherein the analog signals are received from a sensor, wherein the analog signals are based on acoustic signals detected by the sensor.

5. The data acquisition system of claim 1, further comprising:

a housing adapted to encase the data acquisition system, the housing having an exterior surface adapted to connect to a sensor.

6. The data acquisition system of claim 1, further comprising:

a bipolar-unipolar conversion circuitry, the analog-scaling circuitry comprising the bipolar-unipolar conversion circuitry, wherein the bipolar-unipolar conversion circuitry coverts a bipolar polarity dataset of the analog signals to an unipolar polarity dataset.

7. The data acquisition system of claim 6, wherein the filtered analog signals are converted by the bipolar-unipolar conversion circuitry.

8. The data acquisition system of claim 1, wherein the filtered analog signals comprise the analog signals that correspond to frequency values lower than a predetermined frequency value, wherein the predetermined frequency value is based on a targeted frequency range of a sensor connected to the data acquisition system.

9. The data acquisition system of claim 1, wherein the analog anti-alias filter circuitry comprises a second-order active differential filter circuitry and a passive filter circuitry.

10. The data acquisition system of claim 3, wherein the signal-receiving circuitry is adapted to simultaneously receive sensor data via four data channels from a sensor connected to the data acquisition system, wherein the sensor data is based on the analog signals received from the sensor, wherein the sensor data comprises hydrophone data, x-axis data, y-axis data, and z-axis data.

11. The data acquisition system of claim 10, wherein the four data channels comprise a first, second, third and fourth sensor-data channel, wherein the first sensor-data channel is adapted to filter and adjust the hydrophone data, wherein the second sensor-data channel is adapted to filter and adjust the x-axis data, wherein the third sensor-data channel is adapted to filter and adjust the y-axis data, wherein the fourth sensor-data channel is adapted to filter and adjust the z-axis data.

12. The data acquisition system of claim 11, wherein a segment of each one of the four sensor-data channels comprises one of four corresponding buffering circuits that are each connected to the ADC, wherein ADC comprises a four-channel analog-to-digital converter, wherein the ADC is connected to the microcontroller.

13. The data acquisition system of claim 12, wherein the sampling circuitry comprises the ADC, wherein the signal-receiving circuitry is further configured for filtering and bias adjusting the analog signals, wherein the signal-receiving circuitry comprises a set of at least four of the analog anti-alias filter circuitry and a corresponding set of at least four of the analog-scaling circuitry, wherein each of the four data channels comprise one of the at least four of the analog anti-alias filter circuitry and one of the at least four of the analog-scaling circuitry, wherein the microcontroller is adapted to connect to the GPS receiver, wherein the GPS receiver is adapted to transmit the PPS signals to the ADC and the microcontroller, wherein the microcontroller is further adapted to connect to the removable memory medium, wherein the microcontroller is connected to a sensor transceiver via an UART bus, wherein the sensor transceiver is connected to the sensor via a RS-485 bus, wherein the sensor transceiver is configured to receive digital data from the sensor and further configured to transmit the digital data to the microcontroller.

14. The data acquisition system of claim 12, wherein the ADC comprises a four-channel sigma-delta ($\Sigma$-$\Delta$) converter configured to simultaneously sample 24-bits of the analog signals received by the four data channels adapted to simultaneously receive the sensor data from the sensor, wherein the converter is further configured to sample at an off-board data rate of at least 32 kSPS.

15. The data acquisition system of claim 12, wherein the analog anti-alias filter circuitry is further configured to filter the analog signals based on a sampling rate of the ADC.

16. The data acquisition system of claim 1, wherein the PPS signals are generated by the GPS receiver.

17. The data acquisition system of claim 16, wherein the GPS receiver is coupled to the data acquisition system.

18. The data acquisition system of claim 16, wherein the GPS receiver is connected to the data acquisition system via an UART bus adapted to transmit the PPS signals.

19. The data acquisition system of claim 1, further comprising:

a power circuitry configured to receive source power from a power source, wherein the power circuitry is further configured to supply DAQ power to at least one circuitry selected from a group consisting of: a signal-receiving circuitry, a signal-generating circuitry, the analog anti-alias filter circuitry, a bipolar-unipolar conversion circuitry, the analog-scaling circuitry, the sampling circuitry, the digital-filter circuitry, the digital-scaling circuitry, the synchronization circuitry, a storing circuitry, a transmitting circuitry, and combinations thereof.

20. The data acquisition system of claim 19, wherein the power circuitry is further configured to supply adjustable sensor power to a sensor connected to the data acquisition system, wherein the power circuitry is further configured to filter and regulate the source power, wherein the power circuitry is further configured to adjust the source power to generate the adjustable sensor power supplied to the sensor independently from the DAQ power supplied to the at least one circuitry.

21. The data acquisition system of claim 19, wherein the sampling circuitry transmits a power setting to the power circuitry, wherein the sampling rate of the sampling circuitry is based on the power setting, wherein the power usage of the data acquisition system is based on the power setting.

22. The data acquisition system of claim 21, wherein the power setting for the power circuitry comprises an active mode and a hibernation mode, wherein the data acquisition system supports a hibernation function when the power setting switches from the active mode to the hibernation mode based on a predetermined hibernation event, the predetermined hibernation event comprising an event selected from a group consisting of an expiration of a predetermined active period of time and a receipt of a hibernation command, wherein the hibernation function reduces a duty-cycle of the at least one circuitry, wherein the duty-cycle reduction comprises at least 50%, wherein the power setting switches from the hibernation mode to the active mode based on a predetermined activation event, wherein the predetermined activation event comprises an event selected from a group consisting of: an expiration of a predetermined hibernation period of time, receipt of an activation command, and an identification by the data acquisition system of a detected object comprising a predetermined object based on acoustic signals generated by the detected object, wherein the analog signals are based on the acoustic signals.

23. The data acquisition system of claim 19, wherein power source comprises a battery connected to the power circuitry.

24. The data acquisition system of claim 19, wherein power circuitry comprises power-over-bus circuitry adapted to receive host-source power from the host-power source via a host cable, wherein the host-power source is located on the host device, wherein the power-over-bus circuitry is further adapted to receive communication data via the host cable, wherein the host device is adapted to transmit the host-source power and the communication data to the data acquisition system via the host cable.

25. The data acquisition system of claim 1, further comprising:

a storage circuitry configured to store the synchronized signals comprising at least two signals selected from a group consisting of: the scaled analog signals, the scaled digital signals, and the PPS signals, and combinations thereof.

26. The data acquisition system of claim 25, wherein the storage circuitry is configured to store the GPS data received with the PPS signals, and wherein the storage circuitry is further configured to transfer the synchronized signals to the removable memory medium.

27. The data acquisition system of claim 1, further comprising:

a transmission circuitry configured to generate the data packet based on the synchronized signals, wherein the transmission circuitry is further configured to encode the data packet and synchronize the encoded data packet with the GPS data and the PPS signals, wherein the transmission circuitry is further configured to transmit the synchronized data packet.

28. The data acquisition system of claim 1, wherein the data acquisition system is adapted to connect to a transporter via a tether, wherein the transporter is adapted to tow the data acquisition system.

29. The data acquisition system of claim 1, wherein the data acquisition system is connected to an optical communication system adapted to transmit light signals comprising navigation instructions to a transporter, wherein the navigation instructions are based on the synchronized signals that identify a location of a detected object at a point in time, wherein the navigation instructions command the transporter to navigate towards or away from the location of the detected object.

30. The data acquisition system of claim 1, wherein the analog signals are based on acoustic signals generated by a detected object, wherein the acoustic signals are detected by a sensor, wherein the sensor is adapted to generate the analog signals.

31. The data acquisition system of claim 30, wherein the data acquisition system is coupled to the sensor, wherein the sensor is further adapted to transmit the analog signals to the data acquisition system.

32. The data acquisition system of claim 30, wherein the sensor comprises at least one sensor selected from a group consisting of: a hydrophone, a microphone, an accelerometer, a gyroscope, a vector sensor, a pressure sensor, a temperature sensor, an inertial measurement unit, and combinations thereof.

33. The data acquisition system of claim 30, wherein the sensor comprises an underwater acoustic bearing sensor system comprising a vector sensor, a heading sensor, and a pitch-and-roll sensor.

34. The data acquisition system of claim 30, wherein the sensor comprises a piezoelectric hydrophone and an accelerometer.

35. The data acquisition system of claim 30, wherein the sensor comprises an acoustic vector sensor system comprising a plurality of sensors connected to the data acquisition system, wherein the plurality of sensors comprises at least three piezoelectric sensors mounted orthogonally to each other, wherein each of the at least three piezoelectric sensors are adapted to detect acoustic signals from one of three axial directions, wherein the data acquisition system is configured to receive the detect acoustic signal from each of the sensors, wherein the data acquisition system comprises a power circuitry configured to supply sensor power to each of the sensors, wherein the power circuitry is further configured to independently adjust the sensor power supplied to each of the sensors.

36. The data acquisition system of claim 30, wherein the sensor is adapted to be submerged underwater, wherein the detected object comprises an underwater object.

37. The data acquisition system of claim 30, wherein the detected object comprises a predetermined object, wherein the predetermined object comprises at least one targeted object selected from a group consisting of a targeted animal, a targeted vehicle and combinations thereof, wherein the targeted object is located within a targeted zone, wherein the targeted zone comprises at least one zone selected from a group consisting of an underwater zone, an aerial zone, a surface zone and combinations thereof.

38. The data acquisition system of claim 30, wherein the data acquisition system is adapted to store the scaled digital signals corresponding to at least a sampling of the acoustic signals detected by the sensor, wherein the data acquisition system is adapted to receive the analog signals corresponding to a predetermined frequency range, wherein the predetermined frequency range is based on the acoustic signals detected by the sensor, wherein the predetermined frequency range is selectively limits the analog signals processed by the analog anti-alias filter circuitry.

39. The data acquisition system of claim 30, wherein the data acquisition system is located within a transporter, wherein the sensor is connected to the transporter via a tether.

40. The data acquisition system of claim 1, further comprising:
a signal-generating circuitry configured to generate the analog signals based on detected acoustic signals, wherein the data acquisition system comprises a sensor adapted to detect the acoustic signals, wherein the signal-generating circuitry is located within the sensor and is further adapted to generate the sensor data based on the detected acoustic signals and a direction of the sensor.

41. A sensor system, comprising:
a data acquisition system of claim 1, wherein the data acquisition system is adapted to be mounted within a housing, wherein the housing is adapted to encase the data acquisition system; and,
a sensor connected to the data acquisition system and adapted to transmit the analog signals to the data acquisition system, wherein the sensor is adapted to detect acoustic signals and generate the analog signals based on the acoustic signals, wherein the data acquisition system is adapted to receive the analog signals from the sensor.

42. The sensor system of claim 41, wherein the sensor system comprises a power source adapted to power the data acquisition system and the sensor.

43. The sensor system of claim 42, wherein the power source comprises a battery.

44. The sensor system of claim 43, wherein the battery is located within the housing.

45. The sensor system of claim 41, wherein the data acquisition system is connected to the host device.

46. The sensor system of claim 45, wherein the data acquisition system is adapted to couple to the host device.

47. The sensor system of claim 45, wherein the host device comprises a host power source, wherein the data acquisition system is adapted to receive host-source power from the host power source, wherein the host-power source is connected to a solar recharge system mounted on the host device.

48. The sensor system of claim 45, wherein the host device is connected to the data acquisition system via a host cable, wherein the host cable comprises at least one channel selected from a group consisting of: UART bus, RS-485 bus, RS-232 bus, USB bus, TCP/IP bus, UDP bus, Ethernet bus and combinations thereof, wherein the channel is adapted to transmit communication data, wherein the communication data comprises the synchronized data packets generated based on the synchronized signals.

49. The sensor system of claim 41, wherein the sensor is located within the housing.

50. The sensor system of claim 41, wherein the data acquisition system is adapted to be coupled to the sensor, wherein the sensor is configured to communicate with the data acquisition system.

51. The sensor system of claim 41, wherein the sensor is adapted to be mounted within a sensor housing, wherein the sensor housing is adapted to engage with the housing of the data acquisition system.

52. The sensor system of claim 41, wherein the sensor system is a kit comprising a sensor housing adapted to encase the sensor, wherein the kit further comprises a tether adapted to connect the sensor housing and the housing of the data acquisition system, wherein the tether is further adapted to transmit the analog signals and source power.

53. The sensor system of claim 41, wherein the sensor system is adapted to be submerged underwater, wherein the housing is sealed to prevent water intrusion, wherein the acoustic signals are generated by a detected object, wherein the detected object comprises an underwater object located outside the housing.

54. The sensor system of claim 41, wherein the sensor system is adapted to maintain a neutral buoyancy in water, wherein the sensor system lacks a propulsion system, a propeller or a thruster.

55. The sensor system of claim 41, wherein the sensor system is connected to a stationary carrier, wherein the stationary carrier is adapted for deployment at an underwater surface, wherein the underwater surface comprises an underwater floor.

56. The sensor system of claim 45, wherein the host device comprises a transporter adapted to transport the sensor system.

57. The sensor system of claim 56, wherein the transporter comprises at least one vehicle selected from a group consisting of: an unmanned underwater vehicle, an unmanned aerial vehicle, an unmanned surface vehicle, an unmanned autonomous vehicle, a drone, a hybrid mobile vehicle, a hybrid mobile buoy, an aqua-quad, a multi-rotor mobile buoy, a floating buoy, a submerged buoy, a sonobuoy, a pressure vessel, a wave glider, and a sea glider.

58. The sensor system of claim 56, wherein the sensor system is mounted on the transporter.

59. The sensor system of claim 56, wherein the sensor system is connected to the transporter via a tether, wherein the tether is connected to the housing of the sensor system.

60. The sensor system of claim 59, wherein the tether comprises a host cable adapted to transmit the GPS data and the PPS signals from the transporter to the sensor system, wherein the host cable comprises at least one bus selected from a group consisting of: an UART bus, an USB bus, a RS-485 bus, a RS-232 bus, a TCP/IP bus, an UDP bus, an Ethernet bus and combinations thereof.

61. The sensor system of claim 59, wherein the tether comprises electrical wiring adapted to transmit source power from the transporter to the sensor system.

62. The sensor system of claim 59, wherein the tether comprises a two-wire bus adapted to transmit communication data comprising the synchronized data packets generated based on the synchronized signals.

63. The sensor system of claim 62, wherein the sensor system is adapted to transmit the scaled analog signals via the tether to the transporter.

64. The sensor system of claim 62, wherein the sensor system is adapted to transmit the scaled digital signals via the tether to the transporter.

65. The sensor system of claim 45, wherein the host device comprises a radio device adapted to transmit communication data comprising the synchronized data packets generated based on the synchronized signals.

66. The sensor system of claim 45, wherein the host device is adapted to transmit communication data via satellite communications.

67. The sensor system of claim 41, wherein the data acquisition system is adapted to be transported by an animal, and wherein the sensor is adapted to be transported by the animal.

68. A vehicle, comprising:
an exterior surface adapted to connect to a sensor system of claim 41.

69. The vehicle of claim 68, wherein the exterior surface is adapted to connect to the sensor system via a tether.

70. The vehicle of claim 68, wherein the vehicle comprises at least one vehicle selected from a group consisting of: an unmanned underwater vehicle, an unmanned aerial vehicle, an unmanned surface vehicle, an unmanned autonomous vehicle, a drone, a hybrid mobile vehicle, a hybrid mobile buoy, an aqua-quad, a multi-rotor mobile buoy, a floating buoy, a submerged buoy, a sonobuoy, pressure vessel, a wave glider, and a sea glider.

71. The vehicle of claim 68, further comprising:
a host power-over-bus circuitry adapted to transmit adjustable host power and communication data to the data acquisition system via a host cable; and,
a host-communications circuitry connected to the host power-over-bus circuitry via a RS-485 bus, wherein the host-communications circuitry is adapted to connect to the GPS receiver, wherein the host-communications circuitry is adapted to connect to a communications device coupled to the vehicle, wherein the communications device is adapted to communicate with a remote device.

72. A swarm of vehicles, comprising:
a plurality of vehicles of claim 68, wherein each of the plurality of vehicles are adapted to communicate with each other via communications devices mounted on each of the vehicles.

73. The swarm of claim 72, wherein the plurality of vehicles comprises at least a first vehicle and a second vehicle, wherein the data acquisition system of the first vehicle is adapted to transmit the synchronized signals to the data acquisition system of the second vehicle.

74. The swarm of claim 72, wherein the data acquisition system of each of the plurality of vehicles are adapted to communicate the synchronized signals that identify a location of a detected object at a point in time, wherein the synchronized signals are communicated via the communications devices of each of the vehicles.

75. The swarm of claim 74, wherein the synchronized signals are based on acoustic signals generated by the detected object, wherein the acoustic signals are detected by at least one sensor, wherein the at least one sensor is selected from a group consisting of a sensor of the plurality of vehicles and a sonobuoy sensor tethered to a sonobuoy within a sonobuoy field, wherein the data acquisition system of each of the plurality of vehicles are adapted to identify the location of a detected object in real-time based on the detected acoustic signals.

76. A method for using a data acquisition system of claim 1, comprising the steps of:
generating, via the analog anti-alias filter circuitry, the filtered analog signals;
generating, via the analog-scaling circuitry, the scaled analog signals;
generating, via the sampling circuitry, the digitized signals;
generating, via the digital-filter circuitry, the filtered digital signals;
generating, via the digital-scaling circuitry, the scaled digital signals; and,
synchronizing, via the synchronization circuitry, the PPS signals and the scaled analog signals and the scaled digital signals, wherein the synchronization circuitry generates the synchronized signals.

77. The method of claim 76, further comprising the steps of:
receiving the analog signals from a sensor;
converting a bipolar polarity dataset of the analog signals to an unipolar polarity dataset; and,
storing the synchronized signals.

78. The method of claim 76, further comprising the steps of:
receive digital data via a sensor transceiver connected to a sensor, wherein the microcontroller is connected to the sensor transceiver, wherein microcontroller receives the digital data from the sensor transceiver and the synchronized signals from the synchronization circuitry, wherein the analog signals are based on acoustic signals detected by a sensor, wherein the digital data is based on non-acoustic data received from the sensor; and,
synchronize the digital data and the synchronized signals, whereby the synchronizing step generates the synchronized data.

79. The method of claim 76, further comprising the steps of:
generating the data packet based on the synchronized signals;
encoding the data packet for transmission via the RS-485 bus;
receiving the GPS data and the PPS signals from the GPS receiver;
synchronizing the encoded data packet with the GPS data and the PPS signals;
storing the synchronized data packet on the removable memory medium; and,
transmitting the synchronized data packet.

80. A non-transitory computer-readable medium including instructions configured to be executed by a processor adapted to control operations of a data acquisition system of claim 1, wherein the executed instructions are adapted to cause the processor to:
generate, via the analog anti-alias filter circuitry, the filtered analog signals;
generate, via the analog-scaling circuitry, the scaled analog signals;
generate, via the sampling circuitry, the digitized signals;

generate, via the digital-filter circuitry, the filtered digital signals;

generate, via the digital-scaling circuitry, the scaled digital signals; and, synchronize, via the synchronization circuitry, the PPS signals and the scaled analog signals and the scaled digital signals, wherein the synchronization circuitry generates the synchronized signals.

81. The computer-readable medium of claim 80, wherein the processor is adapted to be connected to the analog anti-alias filter circuitry, the analog-scaling circuitry, the sampling circuitry, the digital-filter circuitry, the digital-scaling circuitry, and the synchronization circuitry.

82. The computer-readable medium of claim 80, wherein the executed instructions are further adapted to cause the processor to:

receive the analog signals from a sensor;

convert a bipolar polarity dataset of the analog signals to an unipolar polarity dataset;

store the synchronized signals.

83. The computer-readable medium of claim 80, wherein the executed instructions are further adapted to cause the processor to:

receive digital data via a sensor transceiver connected to a sensor, wherein the microcontroller is connected to the sensor transceiver, wherein microcontroller receives the digital data and the synchronized signals, wherein the analog signals are based on acoustic signals detected by a sensor, wherein the digital data is based on non-acoustic data received from the sensor;

synchronize the digital data and the synchronized signals, whereby the synchronizing step generates the synchronized data;

generate the data packet based on the synchronized data;

encode the data packet for transmission via the RS-485 bus;

receive the GPS data from the GPS receiver;

synchronize the encoded data packet with the GPS data and the PPS signals;

store the synchronized data packet on the removable memory medium; and, transmit the synchronized data packet.

84. A non-transitory computer-readable medium including instructions configured to be executed by a processor adapted to control operations of a data acquisition system, wherein the executed instructions are adapted to cause the processor to:

receive scaled digital signals from a four-channel analog-to-digital converter (ADC), wherein the ADC is connected to a microcontroller, wherein the microcontroller is further adapted to connect to a removable memory medium, wherein the ADC comprises a digital-scaling circuitry configured to generate the scaled digital signals based on filtered digital signals, wherein the filtered digital signals are generated by a digital-filter circuitry of the ADC based on the digitized signals generated by a sampling circuitry of the ADC, wherein the digitized signals comprise a digital sampling of scaled analog signals, wherein the scaled analog signals are generated by an analog-scaling circuitry based on filtered analog signals, wherein the filtered analog signals are generated by an analog anti-alias filter circuitry based on analog signals, wherein the analog signals are based on acoustic signals detected by a sensor, wherein the analog signals are received from the sensor;

receive digital data via a sensor transceiver connected to the sensor, wherein the microcontroller is connected to the sensor transceiver, wherein microcontroller receives the digital data and the scaled digital signals, wherein the digital data is based on non-acoustic data received from the sensor;

synchronize the scaled digital signals with the digital data, whereby the synchronizing step generates synchronized data;

generate a data packet based on the synchronized data, wherein the data packet is configured to be transmitted to a host device;

encode the data packet for transmission via a RS-485 bus;

receive Global Positioning System (GPS) data and Pulse Per Second (PPS) signals from a GPS receiver, wherein the GPS receiver is adapted to transmit the GPS data to the microcontroller and the PPS signals to the ADC and the microcontroller;

synchronize the encoded data packet with the GPS data and the PPS signals; and, store the synchronized data packet on the removable memory medium.

85. The computer-readable medium of claim 84, wherein the executed instructions are further adapted to cause the processor to:

transmit the synchronized data packet to the host device, wherein the host device is configured to identify a detected object comprising a predetermined object based on the acoustic signals generated by the detected object.

86. The computer-readable medium of claim 84, wherein the executed instructions are further adapted to cause the processor to:

activate the data acquisition system for a predetermined period of time.

87. The computer-readable medium of claim 84, wherein the executed instructions are further adapted to cause the processor to:

deactivate the data acquisition system for a predetermined period of time.

88. The computer-readable medium of claim 84, wherein the executed instructions are further adapted to cause the processor to:

transmit commands from the data acquisition system to the host device.

89. The computer-readable medium of claim 88, wherein the commands comprise navigation instructions, wherein the navigation instructions are based on synchronized signals that identify a location of a detected object at a point in time, wherein the navigation instructions command the host device to navigate towards or away from the location of the detected object.

* * * * *